US009297640B2

(12) United States Patent
Tassakos et al.

(10) Patent No.: US 9,297,640 B2
(45) Date of Patent: Mar. 29, 2016

(54) METHOD FOR CALIBRATING AN OPTICAL ARRANGEMENT

(71) Applicant: inos Automationssoftware GmbH, Stuttgart (DE)

(72) Inventors: Charalambos Tassakos, Stuttgart (DE); Constantinos Theiakos, Gaertringen (DE); Thomas Gerhard Lesch, Stuttgart (DE); Andreas Demopoulos, Leighton Buzzard (GB)

(73) Assignee: INOS AUTOMATIONSSOFTWARE GMBH, Stuttgart (DE)

( * ) Notice: Subject to any disclaimer, the term of this patent is extended or adjusted under 35 U.S.C. 154(b) by 0 days.

(21) Appl. No.: 14/303,915

(22) Filed: Jun. 13, 2014

(65) Prior Publication Data

US 2014/0368838 A1    Dec. 18, 2014

(30) Foreign Application Priority Data

Jun. 13, 2013   (EP) ..................................... 13171770

(51) Int. Cl.
*G01J 1/10*     (2006.01)
*G01B 11/00*   (2006.01)
*G01B 21/04*   (2006.01)

(52) U.S. Cl.
CPC ............ *G01B 11/002* (2013.01); *G01B 21/042* (2013.01); *G05B 2219/37571* (2013.01); *G05B 2219/39057* (2013.01); *G05B 2219/40613* (2013.01)

(58) Field of Classification Search
CPC .............. G01N 21/49; G01N 33/4925; G01N 2021/3144; G01N 21/21; G01N 21/274; G01N 21/314; G01N 21/3504; G01N 21/474; G01N 21/64; G01N 2201/06113; G01B 11/00; G01B 11/002; G01B 21/042; G01J 2003/104
See application file for complete search history.

(56) References Cited

U.S. PATENT DOCUMENTS

| 2005/0117033 A1* | 6/2005 | Matsui | 348/239 |
| 2005/0237385 A1* | 10/2005 | Kosaka et al. | 348/42 |
| 2007/0002015 A1* | 1/2007 | Mohri et al. | 345/157 |

FOREIGN PATENT DOCUMENTS

| DE | 103 11 247 A1 | 9/2004 |
| EP | 1 524 494 A1 | 4/2005 |

(Continued)

OTHER PUBLICATIONS

Aug. 16, 2013 European Search Report for Application No. 13171770.4-1558.

*Primary Examiner* — Michael P Stafira
(74) *Attorney, Agent, or Firm* — Howard & Howard Attorneys PLLC

(57) ABSTRACT

A method for calibrating an optical arrangement in respect to a global coordinate system is provided. The optical arrangement includes a rigid carrier, an optical acquiring unit and a light emitting unit both releasably connected to the carrier. The optical acquiring unit or the light emitting unit is calibrated in respect to a reference coordinate system offline and independently from the optical arrangement. Values of a conversion matrix are determined for converting the calibration data into corresponding calibration data in respect to the global coordinate system. A calibration of the entire optical arrangement is performed once in respect to the global coordinate system. During the intended use of the optical arrangement, the calibration data acquired for the unit and/or the respective values of the conversion matrix are considered when generating control signals for the unit and/or when processing sensor signals received from the unit.

9 Claims, 18 Drawing Sheets

(56) References Cited

FOREIGN PATENT DOCUMENTS

| EP | 1 533 998 | A2 | 5/2005 |
| SG | 188011 | A1 | 3/2013 |
| WO | 00/71970 | A1 | 11/2000 |
| WO | 02/16865 | A2 | 2/2002 |

* cited by examiner

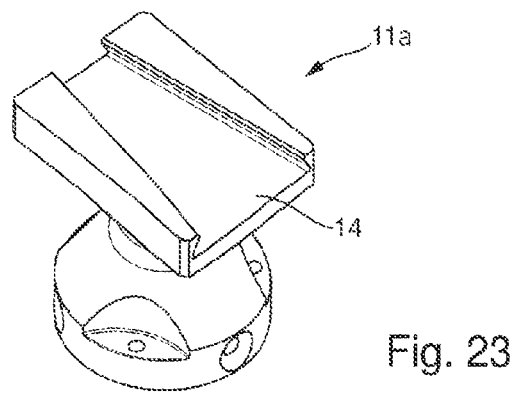
Fig. 23
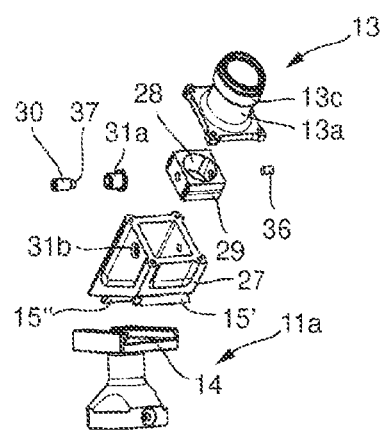
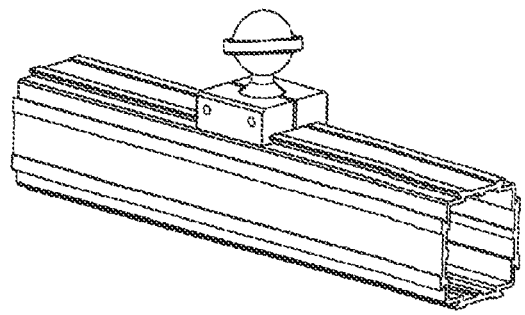
Fig. 24

METHOD FOR CALIBRATING AN OPTICAL ARRANGEMENT

CROSS-REFERENCE TO RELATED APPLICATION

This application is based upon and claims priority to European Patent Application EP 13171770.4-1558 filed on Jun. 13, 2013.

BACKGROUND OF THE INVENTION

1. Field of Invention

The present invention relates to a method for calibrating an optical arrangement.

2. Description of Related Art

The present invention refers to a method for calibrating an optical arrangement in respect to a global coordinate system. The optical arrangement includes a carrier unit made of a rigid material, an optical acquiring unit and a light emitting unit both releasably connected to the carrier unit. Such an optical arrangement is known from DE 10311247 A1, for example, wherein the carrier unit has a profile with a U-shaped cross section that profile can be cut and folded from a metal sheet. The light emitting unit and/or the optical acquiring unit each include a housing element, which is formed in such a way that it can be inserted into the inside of the profile from an open side of the profile and disposed therein, preferably free from float or play. The profile includes holes for receiving screws and the housing of the optical acquiring unit and the light emitting unit, respectively, have threaded holes for receiving the screws put through the holes of the profile. In order to releasably fasten the optical acquiring unit and the light emitting unit, respectively, to the profile, fastening screws are inserted into the holes and screwed into the threaded holes.

This kind of fastening enables a high precision fastening of the optical acquiring unit and the light emitting unit, respectively, to the carrier unit. However, after loosening the screwed connections, the housings can be moved inside the profile and, when tightening the screws again or after having inserted another optical acquiring or light emitting unit to the carrier unit, it cannot be ensured that the optical acquiring unit and the light emitting unit, respectively, are still and will be fixed in exactly the same position in respect to the carrier unit as they were before. Thus, the type of connection taught in the prior art is not repeatable.

Therefore, in the prior art, first the optical acquiring unit and the light emitting unit are connected and fixed to the carrier unit in any desired position. Then the entire optical arrangement has to be calibrated in respect to a global coordinate system. The global coordinate system can be assigned to a single optical arrangement or to a measuring arrangement, for example a measuring tunnel, including a plurality of optical arrangements of the above-identified kind. The calibration has to be performed prior to the first use of the optical arrangement and thereafter each time one of the optical acquiring or light emitting units has been exchanged or has deliberately or unintentionally changed its position in respect to the carrier unit. The necessity of calibrating the entire optical arrangement has the disadvantage that calibration has to take place inline (during an interruption of the optical arrangement's intended use). Furthermore, the calibration of the optical arrangement according to the prior art is very complicated, cumbersome, and time consuming.

Therefore, it is an object of the present invention to suggest a method for calibrating an optical arrangement which is easy, fast and, in particular, can be performed offline, that is during the intended use of the optical arrangement.

SUMMARY OF THE INVENTION

The present invention overcomes the disadvantages in the prior art in a method, including the steps of: defining a reference coordinate system different from the global coordinate system; calibrating an optical acquiring unit or a light emitting unit in respect to the reference coordinate system prior to its intended use and separately from the rest of the optical arrangement by acquiring appropriate calibration data; connecting the calibrated optical acquiring unit or light emitting unit to the carrier unit; performing only once for a given global coordinate system and a given reference coordinate system a conventional calibration of the entire optical arrangement and thereby determining values of a conversion matrix for converting the calibration data acquired in respect to the reference coordinate system into corresponding calibration data in respect to the global coordinate system; and thereafter, for all further calibrated optical acquiring units and/or light emitting units connected to the carrier unit, making use of the optical acquiring units and/or light emitting units as part of the optical arrangement by considering the calibration data acquired for the optical arrangement or the respective values of the conversion matrix when generating control signals for the units and/or when processing sensor signals received from the units during the intended use of the optical arrangement.

The invention suggests a calibration of each part of the optical arrangement separately and an assembly of the separately calibrated parts in order to form the calibrated optical arrangement without a global calibration of the entire arrangement each time a new unit has been mounted. Only once when the optical arrangement with the units calibrated offline in respect to the reference coordinate system is used for the first time within the global coordinate system the entire arrangement has to be calibrated in respect to the global coordinate system. In this way the values for the conversion matrix are determined. Thereafter, an optical acquiring unit or light emitting unit separately calibrated in respect to a reference coordinate system is simply inserted into the optical arrangement (attached to the carrier unit), which was already previously calibrated in respect to the global coordinate system. The individual calibration data of the optical acquiring unit or the light emitting unit referring to the reference coordinate system is transformed into calibration data referring to the global coordinate system with the conversion matrix.

Once the individual optical and light emitting units are calibrated in their own reference frame they are installed into the carrier unit or a space framework before they can be calibrated with respect to the global system of axes. After the individually calibrated optical and light emitting units are installed into the carrier unit or space frame, the entire optical or measurement arrangement is calibrated with respect to the global system of axes. This is an initial calibration that is carried out prior to the commissioning of the arrangement and need only be performed once. The objective of the initial global calibration is to establish the conversion matrix. This matrix relates the calibration data of individual units acquired in respect to the reference coordinate system into corresponding calibration data in respect to the global coordinate system. It is noted that depending on the calibration method employed for calibrating in the laboratories (offline) the individual optical acquiring and light emitting units, the conversion matrix can be trivial for direct calibration, or have some other form for model based calibration (Tsais calibration model, for example).

After commissioning of the system, when individual optical acquiring or light emitting units have to be exchanged with new ones, the entire optical or measurement arrangement does not have to be recalibrated with respect to the global coordinate system. The conversion matrix of a new part is obtained from the conversion matrix of the first part that was fitted during the initial global calibration step and the calibration data of the first and new parts are identical since both data were obtained with respect to the same reference system of axes. For this reason it is necessary that the optical acquiring or light emitting units are connected to the carrier unit and, hence, located within the measurement arrangement, in a highly precise and exactly repeatable manner. This can be achieved in many different ways, some of which are described later on by way of example. One example is a so-called tapered dovetail connection.

In one embodiment, the separate parts of the optical arrangement are calibrated in respect to a reference coordinate system different from the global coordinate system. In particular, it is suggested that the calibration of the optical acquiring unit and/or the light emitting unit is performed offline from the intended use of the optical arrangement. However, the use of the optical arrangement can continue during calibration of the optical acquiring unit and/or the light emitting unit, by using other, previously calibrated units. For example, it is possible that one or more optical acquiring units and/or the light emitting units are calibrated separately ahead of their actual use in an optical arrangement. Hence, the units can be calibrated during proper functioning and intended use of the optical arrangement. Then, if an optical acquiring unit and/or a light emitting unit of an optical arrangement fails or has to be replaced for another reason, one of the already separately calibrated units is fixed to the optical arrangement's carrier unit. Of course, this is done during a short interruption of the optical arrangement's intended use. However, after introduction of the unit, the optical arrangement can resume its intended use without a time-consuming calibration of the entire optical arrangement.

The newly fixed unit is functionally integrated into the optical arrangement, in particular calibrated in respect to the global coordinate system, simply with the values of the conversion matrix. The conversion matrix of the newly fixed unit is obtained from the conversion matrix of the first part that was fitted during the initial global calibration prior to commissioning of the arrangement and the calibration data of the first and newly fitted parts since both data were obtained in respect to the same reference system of axes. Therefore, once each individual unit is calibrated as a single entity offline, its individual conversion matrix is automatically obtained. The values of the conversion matrix are taken into consideration during the generation of control signals for and/or during the processing of sensor signals from the optical acquiring unit and/or the light emitting unit, thereby performing an online calibration of the units. Hence, the time of interruption of the intended use of the optical arrangement for (re)calibrating the optical arrangement can be reduced to a minimum because one of the units is simply replaced by another previously calibrated unit and the time consuming calibration of the entire optical arrangement can be omitted.

The separate calibration of the optical acquiring unit and/or the light emitting unit in respect to the reference coordinate system can be performed in any known way. Possible ways of calibration are disclosed, for example, in EP 1524494 A1 or in WO 02/16865 A1, respectively. These references are incorporated herein by reference. In particular the detailed description contained in these references regarding the embodiment of a calibration apparatus and regarding the process of calibrating the unit in respect to at least one calibration surface containing calibration elements of certain dimensions and in a certain arrangement is to be made part of the present invention in order to avoid a repetition. The calibration surface and the calibration elements, respectively, define the reference coordinate system.

In one embodiment, the reference coordinate system is defined in respect to a calibration arrangement separate from the optical arrangement. Hence, the offline calibrated units are calibrated on a separate calibration arrangement, which can be, for instance, positioned distant to the optical arrangement. This allows continuous intended use of the optical arrangement during the calibration of one or more optical acquiring units and/or light emitting units. Hence, the calibration of the optical acquiring unit or the light emitting unit in respect to the reference coordinate system is performed offline from and parallel to and during the intended use of the optical arrangement.

In one embodiment, the optical acquiring unit or the light emitting unit to be calibrated has a unique serial number. The acquired calibration data and/or the values of the conversion matrix or corresponding values indicative of the calibration data and/or the values of the conversion matrix are stored in a database together with and relating to the serial number of the calibrated optical acquiring unit or light emitting unit. A control and processing unit of the optical arrangement has access to the database and the data and/or values stored therein, preferably online in order to use the optical acquiring unit and/or the light emitting unit connected to the carrier unit and forming part of the optical arrangement with the corrected signals and values of the calibrated units during the intended use of the optical arrangement. The serial number allows an unambiguous identification and assignment of the stored data and/or values to a certain optical acquiring unit or light emitting unit.

The optical acquiring unit or the light emitting unit may be connected to the carrier unit with a stress and clearance free and repeatable connection. This allows the calibration of the units to be carried out offline and separately from the entire optical arrangement and parallel to the intended use of the arrangement. By fixing the calibrated units to the carrier unit with the repeatable connection, the entire optical arrangement becomes calibrated This special connection of the optical acquiring unit and the light emitting unit to the carrier unit allows a positioning of the units in respect to the remaining parts of the optical arrangement in a highly precise and exactly repeatable position. The precise and repeatable connection of the optical acquiring and light emitting units to the rest of the optical arrangement defines an interface above of which there are changes in the form of differences between individual units and below of which there are practically no differences as the supporting carrier unit is a mechanically and thermally stable structure. The values of the conversion matrix can be defined beforehand during the separate calibration of the unit(s) with a high precision and in a non-time critical manner and can be considered online during the intended use of the optical arrangement. Hence, the present invention allows a kind of online calibration of the optical arrangement during its intended use without losing time for online global calibration of the entire optical arrangement which can be omitted according to the invention.

The optical acquiring unit or the light emitting unit may be connected to the carrier unit with a two-part tapered dovetail connection. The tapered dovetail connection is only one of many possible precise and repeatable connections of the optical acquiring and/or the light emitting units to the carrier unit. The precision of the connection is preferably in the order of microns. The connection establishes an interface above which changes are introduced with different individual mechanical and/or optical characteristics of the optical acquiring and light emitting units and below this interface there are no changes because the carrier unit is a mechanically and thermally stable structure. The interface may be in the form of the tapered dovetail connection but is not limited to this type of connection. Other connections could be used, too, provided they achieve the same order of precision and repeatability so no connection errors are introduced at this interface level.

In particular, the releasable connection of the optical acquiring unit and the light emitting unit, respectively, to the carrier unit according to one embodiment of the present invention includes a first partial element in the form of a groove having a longitudinal extension and a trapeze formed cross section. In a cross sectional view at any given position along the longitudinal extension of the groove the width of the groove near the bottom of the groove is larger than the width of the groove opposite to the bottom of the groove, where the groove opens versus the outside. Further, the groove constantly converges along its longitudinal extension from one end of the groove to the opposite end, thereby constantly reducing the width of the groove along its longitudinal extension. So if one looks at two positions of the groove spaced apart from one another along the longitudinal extension of the groove in a cross sectional view, the width at the bottom of the groove at a first position is larger than the width at the bottom of the groove at another position. Equally, the width of the groove opposite to the bottom of the groove, where the groove opens to the outside, at the first position is larger than at the second position. The depth or profoundness of the groove may be constant along the entire longitudinal extension of the groove. However, it would also be possible that the depth or profoundness of the groove constantly increases or decreases from one end to the other end along the longitudinal extension of the groove.

Further, the releasable connection between the optical acquiring unit and the light emitting unit, respectively, and the carrier unit, according to the present invention includes a second partial element in the form of a protrusion with a longitudinal extension and having a cross sectional form corresponding to the cross sectional form of the groove. Hence, the protrusion also has a trapeze-like cross sectional form. In a cross sectional view the width of the protrusion converges along its longitudinal extension from one end to the opposite end. The degree of converging of the sidewalls of the groove and of the protrusion is advantageously the same for the groove and for the protrusion. The length along the longitudinal extension of the protrusion does not necessarily have to correspond to the length of the groove. However, it is preferred that the length of the protrusion is at least as long as the length of the groove. Preferably, the lengths of the groove and the protrusion are identical.

The meaning of "two-part" in connection with the tapered dovetail connection is that the suggested connection arrangement includes a first part (groove or protrusion) and a corresponding second part (protrusion or groove). The meaning of "tapered" is that the sidewalls of the groove and of the protrusion converge or diverge in respect to their longitudinal axis. The meaning of "dovetail" refers to the trapeze-like cross sectional form perpendicular to the longitudinal axes of the groove and the protrusion.

At that end of the groove which has a larger width than the opposite end the groove opens into, an introduction and receiving section is located, which receives the protrusion displaced in its longitudinal extension in respect to the groove and with its longitudinal extension essentially parallel to the longitudinal extension of the groove. After insertion of the protrusion into the introduction and receiving section, the protrusion can be inserted into the groove in a direction essentially extending parallel to the longitudinal extension of the groove. Thereby, that end of the protrusion, which has a smaller width in the sectional view than the opposite end, is directed towards the groove when inserted into the introduction and receiving section thereby facing the opening of the groove for subsequent insertion. The protrusion can be inserted into the groove through the opening of the groove facing the introduction and receiving section. Because the end of the protrusion having a smaller width is inserted into that end of the groove having a larger width, a relatively imprecise positioning of the protrusion in respect to the groove during the insertion of the protrusion into the groove is sufficient. Therefore, establishing the connection between the optical acquiring unit or the light emitting unit on the one hand and the carrier unit on the other hand can be easily performed automatically, for example with an industrial robot. The further the protrusion is introduced into the groove the more the protrusion is automatically positioned transversally with respect to the longitudinal extension of the groove. During establishment of the releasable connection between the optical acquiring unit and the light emitting unit, respectively, and the carrier unit, the groove serves as guides for the protrusion, thereby significantly alleviating and allowing fully authorized establishment of the releasable connection.

As soon as the end of the protrusion with the smaller width during the introduction into the groove arrives at a position within the groove where the width of the groove corresponds to the width at the slimmer end of the protrusion, the insertion movement comes to an end. If the degree of conical convergence of the groove's sidewalls and of the protrusion is the same, at the end of the introduction movement the sidewalls of the groove and of the protrusion rest on one another with their entire surfaces. Hence, the final position of the introduction movement is defined with a particularly high precision. At the same time, establishing the releasable connection is quick and easy.

The groove can either be located at the carrier unit or at a housing element of the optical acquiring unit or the light emitting unit, respectively. The protrusion is located at the corresponding other part of the connection arrangement, that is at the optical acquiring unit and the light emitting unit if the groove is located at the carrier element, or at the carrier element if the groove is located at the housing element of the optical acquiring unit or the light emitting unit, respectively. Preferably, the protrusion is located at the housing element of the optical acquiring unit and the light emitting unit, respectively, and the groove is located at the carrier unit.

In one embodiment of the present invention, the protrusion is held in its final position in the groove by holding or securing the optical or lighting unit with respect to the carrier unit. The holding or securing can be simply realized by some frictional contact effective between at least one of the walls of the protrusion and at least one of the corresponding walls of the groove. However, it is also possible that the two-part tapered dovetail connection arrangement could be used for holding or securing the optical acquiring unit and the light emitting unit, respectively, with respect to the carrier unit when it is properly connected and positioned in its final position in respect to the carrier unit. By way of example, a spring-loaded holder or screws, which provide for secure fixation of the optical acquiring unit and the light emitting unit, respectively, with respect to the carrier unit in its final position with frictional contact or a form fit or positive fit.

The present invention is particularly suitable for optical arrangements where the optical acquiring unit acquires characteristics of a work piece within an acquiring area, and where the light emitting unit illuminates at least part of the work piece within the acquiring area. The optical acquiring unit may include a camera for optically acquiring characteristics of the work piece. The camera can be designed as an analogue or as a digital camera, in particular as a CCD- or a CMOS-camera. The light emitting unit may include a laser light emitting unit for illuminating at least part of the work piece within the acquiring area with a laser light beam. The laser probe can be designed such that it generates a line-typeor grid-type light pattern at least in part of the acquiring area on the work piece's surface and possibly on adjacent component parts. The laser light unit can emit light within the visible or the invisible (for example, UV, IR) wavelength interval. The light emitting unit and the optical acquiring unit can be constantly activated, or can be activated at discrete points in time on a synchronized clocked basis.

A digital camera optically acquires an image of the work piece and possibly one or more adjacent component parts and generates an electrical sensor signal corresponding to and indicative of the acquired image. The sensor signal is processed by an evaluation unit or image processing, for example for determining a gap and/or a displacement (parallel offset) of the work piece in respect to an adjacent component part. In particular, the optical arrangement can be used during the mounting of flaps (for example doors, a boot lid, a front or engine lid etc.) of a motor vehicle or of other vehicle components (for example a sun roof) into an appropriate opening in the vehicle body. During mounting of the workpiece the gap and/or the displacement values of the workpiece in respect to the adjacent component part or the remaining vehicle body is constantly determined and the insertion of the workpiece into the opening in the vehicle body controlled accordingly.

The determined values of the gap and/or displacement can be used for controlling an industrial robot, which has the workpiece for mounting to or into the opening in the vehicle body attached to the distal end of its robot arm. The robot or robot arm is controlled in order to make all gaps between the workpiece and the adjacent vehicle components as equal as possible and to adjust the displacement in a desired way, for example as small as possible. Of course, the optical arrangement can also be used for attaching or inserting of other parts, for example a radiator grill, vehicle lighting devices (headlights or lamps) to or into a vehicle body. Further, the optical arrangement can also be used in the field of quality control for controlling the accuracy during the manufacturing and/or mounting process on the basis of already mounted body components. Furthermore, it is possible to use the optical arrangement in other fields, for example for inserting and mounting a hop or a sink into a work or kitchen top.

Furthermore, it is suggested that the optical arrangement may include a controller connected to the optical acquiring unit and the light emitting unit, respectively, and that the carrier unit include a hollow space wherein the controller is located. The controller is used to process the sensor signals received from the optical acquiring unit, in order to be able to determine and characterize the state and/or characteristics of the work piece within the acquiring area, for example with regard to a gap and/or a displacement in respect to one or more adjacent body component parts. Processing of the sensor signals may be effected by an adapted image processing software, which can run on one or more microprocessors of a computer.

Further, the controller may be responsible for controlling the optical acquiring unit and the light emitting unit, respectively. For example, they can provoke the light emitting unit to generate and emit a desired light bundle or light pattern. Additionally, they can provoke the optical acquiring unit to acquire one or more images of the work piece within the acquiring area when the light emitting unit is activated. In particular, a clocked operation of the light emitting unit and the optical acquiring unit is advantageous, in which the light emitting unit is temporarily turned on only for a very short period of time for illuminating the work piece and synchronized thereto the optical acquiring unit is temporarily triggered to make one or more images of the illuminated work piece. Further, controller may control the functioning of additional appliances located at the optical arrangement, like for instance a cover element movably disposed in front of an acquiring window of the optical acquiring unit in order to protect the acquiring window and the optical acquiring unit, respectively, from heat, mechanical, chemical or physical damage, for example from hot soldering splatters or the like. The cover elements are actuated by electric motors or solenoids, which can be controlled and activated by the controller.

The controller can receive control and operational information from a higher-ranking control unit, which may be located outside of the carrier unit and separate from the optical arrangement. The higher-ranking control unit can make, part of a measuring arrangement for example a measuring tunnel, including a plurality of optical arrangements of the kind described herein.

In one embodiment, the optical arrangement is adapted for connection to a distal end of an arm of a manipulator, in particular to a distal end of a robot arm of an industrial robot. The optical arrangement can be moved by the manipulator such that optical arrangement's acquiring area includes any desired work piece, in order to determine the condition or characteristic (position, arrangement and displacement) of the work piece within the acquiring area, either absolutely inspected to the global coordinate system, or relatively in respect to one or more adjacent body components. This has the advantage that one and the same optical arrangement can be used for acquiring the condition of one or more work pieces in different acquiring areas spaced apart from one another.

Further, it is possible that the manipulator moves the optical arrangement during the image acquiring process, thereby following a corresponding movement of the work piece (for example a flap of a vehicle body) or of an adjacent body component (for example a motor vehicle body located on an assembly line), along a production line, so that the work piece and the adjacent body component remain within the acquiring area during the process of image acquiring. The optical arrangement can be connected to the distal end of the robot arm, for example, with a ball joint.

Additionally, a fastener for a work piece (for example a flap of a vehicle body, a vehicle lighting device, a radiator grill, a hop, a sink, etc.) can be provided at the distal end of the robot arm additionally to the optical arrangement according to the present invention, so that the optical arrangement is located in a fixed position in respect to the work piece and is moved together with the work piece. Hence, the robot arm is used for bringing the work piece into its mounting position and at the same time moving the optical arrangement such that it can acquire and determine gaps and displacements of the work piece in respect to adjacent components during the mounting process. The fastener can, for example, include one or more mechanical grippers, vacuum suction devices, solenoids, etc.

For further enhancing the precision of the calibration without having to incorporate an expensive and complex temperature control, it is suggested that the optical acquiring unit or the light emitting unit are each separately calibrated at a plurality of different ambient temperatures, that corresponding temperature dependent calibration data is generated for each of the ambient temperatures and that the data is stored in a database, and that during the intended use of the optical arrangement the current ambient temperature is determined, the database is accessed and based on the current ambient temperature at least one set of calibration data is selected to be used for the online calibration of the optical acquiring unit or the light emitting unit, which was acquired at an ambient temperature which comes closest to the current ambient temperature.

Alternatively, it is suggested that those two sets of calibration data are selected, which were acquired at ambient temperatures which come closest to the current ambient temperature, and that the calibration data to be used for the online calibration of the optical acquiring unit or the light emitting unit during the intended use of the optical arrangement is determined with interpolation among the selected two sets of calibration data.

BRIEF DESCRIPTION OF THE DRAWINGS

Other objects, features, and advantages of the present invention will be readily appreciated as the same becomes better understood after reading the subsequent description taken in connection with the accompanying drawing wherein:

FIG. 23 shows a connector for an optical acquiring unit (for example, camera assembly) or a light emitting unit (for example, laser/projector assembly).

FIG. 24 shows an exploded view of a laser holder assembly.

DETAILED DESCRIPTION OF THE INVENTION

Figure 1:
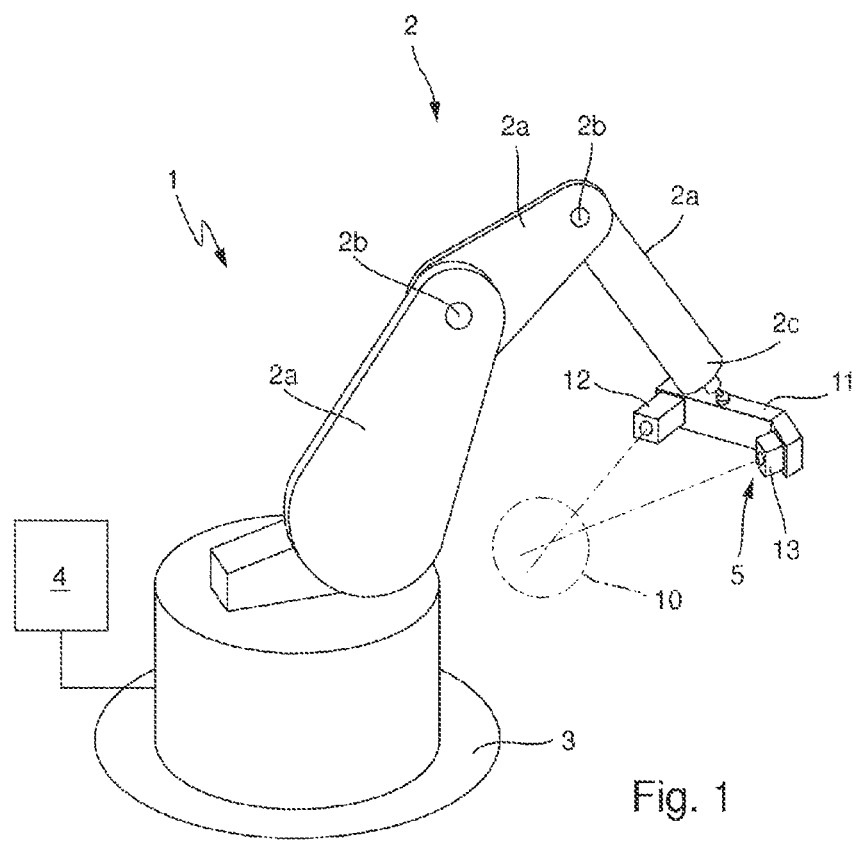
FIG. 1 shows an industrial robot with an optical arrangement according to the present invention attached to the distal end of the robot arm in one embodiment.

FIG. 1 shows a conventional manipulator with an optical arrangement according to the present invention attached to a distal end of a manipulator arm. In the embodiment of FIG. 1, the manipulator is an industrial robot 1 having a robot arm 2 including a plurality of arm sections 2a and universal links or joints 2b for interconnecting the robot arm sections 2a with one another. The distal end 2c of the robot arm 2 can be moved in any desired position and orientation (located in any desired position and facing in any desired direction) in six degrees of freedom within the robot's range of movement.

In the shown embodiment, the robot 1 is statically fixed to a ground floor 3. However, it is also possible that the robot 1 is mobile and freely movable in respect to the ground floor 3. The robot 1 includes a control unit 4, which may be connected to a higher-ranking controller (not shown, but generally known in the art). The controller can be in charge of one or more robots 1 and coordinate and control their movement. For example, the controller can be in charge of an entire measuring arrangement, such as a measuring tunnel. The control unit 4 generates control signals in order to make the robot 1 or the robot arm 2, respectively, move in a desired way in order to make the distal end 2c of the robot arm 2 move along a desired path into a desired position within a desired working or acquiring area and to face a desired working or acquiring area and a desired orientation at the end of the path. Other parameters of the robot's movement like speed and acceleration of the distal end 2c of the robot arm 2 can be controlled, too. The control unit 4 may also generate and provide control signals for the optical arrangement 5 fixed to the distal end 2c of the robot arm 2.

The optical arrangement 5 may be attached to the distal end 2c of the robot arm 2 in a releasable manner. Furthermore, the optical arrangement 5 can be fixed to the distal end 2c in any desired orientation. The optical arrangement 5 may be attached to the distal end 2c with a ball joint connection assembly (see FIGS. 17-22 and 24). The ball joint connection can be freely moved in various degrees of freedom in its released state and can be fixed in a desired orientation in its fixed state. The optical arrangement 5 and the ball joint connection assembly will be described in greater detail below.

Figure 2:
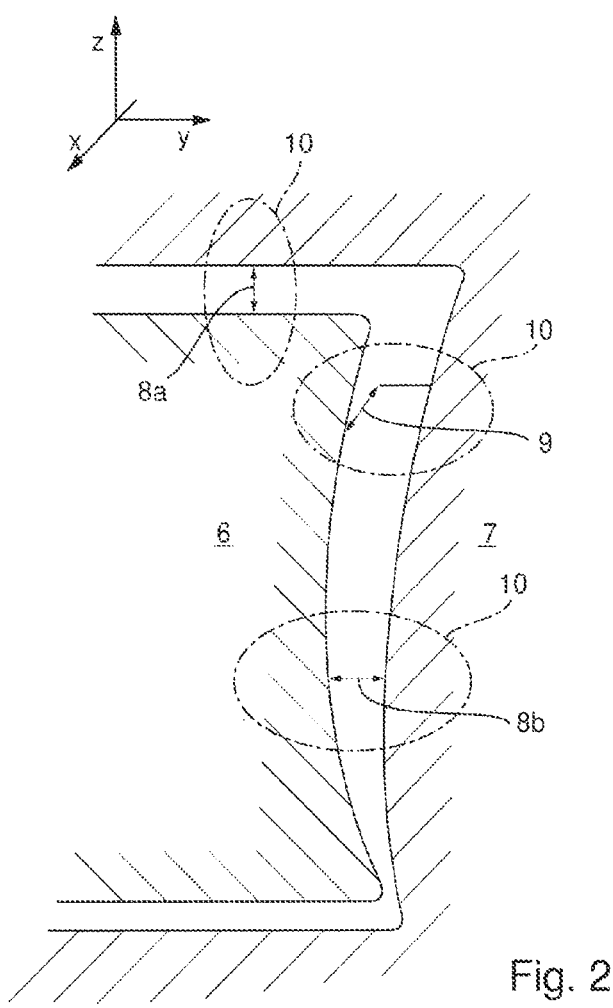
FIG. 2 shows an example for a possible use of the optical arrangement according to the present invention.

Now referring to FIG. 2, an example for a possible use of the optical arrangement 5 is provided. A work piece 6 is shown positioned and orientated in a certain manner in respect to an adjacent component 7. In particular, the work piece 6 is positioned with certain values for gaps 8a, 8b between the work piece 6 and the component 7 and with a certain value for a displacement 9 in respect to a plane defined by the extension of component 7. The work piece 6 can be, for instance, a flap (door, trunk lid, engine lid, etc.) of a motor vehicle and the component 7 can include, for instance, other parts of a vehicle body and/or already mounted flaps, doors or lids. Alternatively, the work piece 6 could also be a lighting device, a radiator grill, a pane of glass or similar to be mounted and fixed in an appropriate opening in a vehicle body 7. In another embodiment, the work piece 6 could also be a hob or cook top or a kitchen sink to be mounted in an appropriate opening of a kitchen work plate 7. Numerous other embodiments are immediately apparent to the skilled person and are within the scope of the present invention.

The optical arrangement 5 according to the present invention may be used for determining the gaps 8a, 8b and the displacement 9 of the work piece 6 in respect to the component 7 within given acquiring areas 10. The optical arrangement 5 can be moved into the desired position and orientation in respect to the work piece 6 and the component 7, such that the gap 8a or 8b and/or the displacement 9 to be determined is located within the acquiring area 10 of the optical arrangement 5. This movement of the optical arrangement 5 into the derived position and orientation of the optical arrangement 5 can be effected by the robot 1 or the robot arm 2, respectively.

Figure 19:
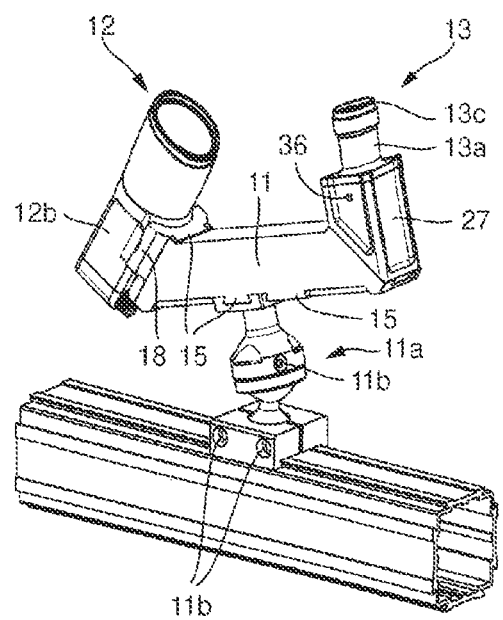
FIG. 19 shows two basic elements (camera assembly and laser/projector assembly) to form an optical arrangement (for example, laser triangulation sensor) according to the invention.
Figure 20:
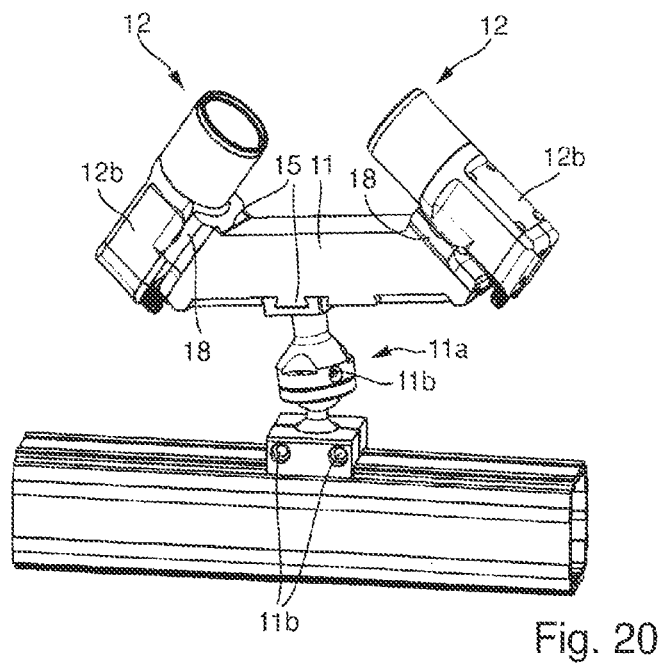
FIG. 20 shows two basic elements (for example, camera assemblies) to form an optical arrangement for example, stereo measurement sensor) according to the invention.
Figure 21:
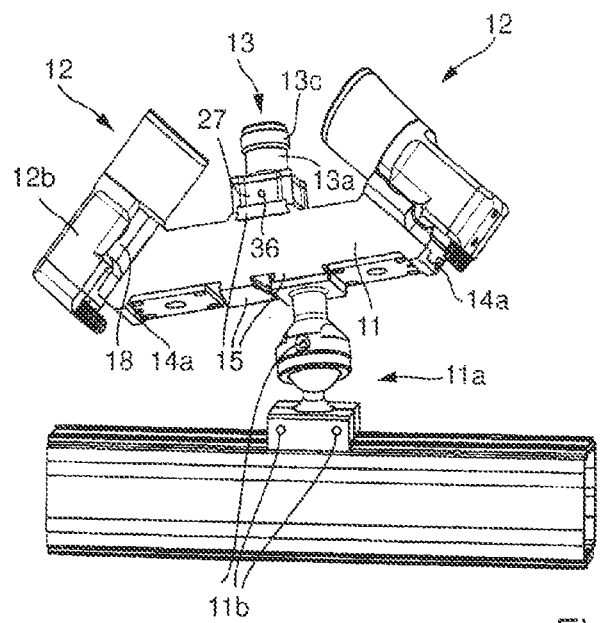
FIG. 21 shows three basic elements (for example, two camera assemblies and a laser/projector assembly) to form an optical arrangement (for example, stereo and laser triangulation sensor) according to the invention.

Possible embodiments of the optical arrangement 5 are shown on an exemplary basis in FIGS. 19 to 21. By way of non-limiting example, these include, a laser triangulation sensor (FIG. 19), a stereo measurement sensor (FIG. 20), and a stereo and laser triangulation sensor (FIG. 21). The construction and the exact functioning of the optical arrangement 5 for acquiring the dimensions of gaps 8a, 8b and of displacements 9 is described in detail in DE 19910699 A1 and in DE 10348500 A1. Both documents are incorporated herein by reference. These two documents describe in detail how an optical arrangement similar to the optical arrangement 5 according to the present invention acquires images within an acquiring area corresponding to the acquiring area 10, how corresponding sensor signals are generated and how the sensor signals corresponding to and indicative of the acquired images are processed in order to determine the values of gaps 8a, 8b and displacements 9. The functioning of the optical arrangement 5 is very similar to that of the optical arrangement described in the two documents. The present invention refers to an advantageous construction of the method for calibration and an advantageous optical arrangement 5, which will be described in detail hereinafter.

Figure 3:
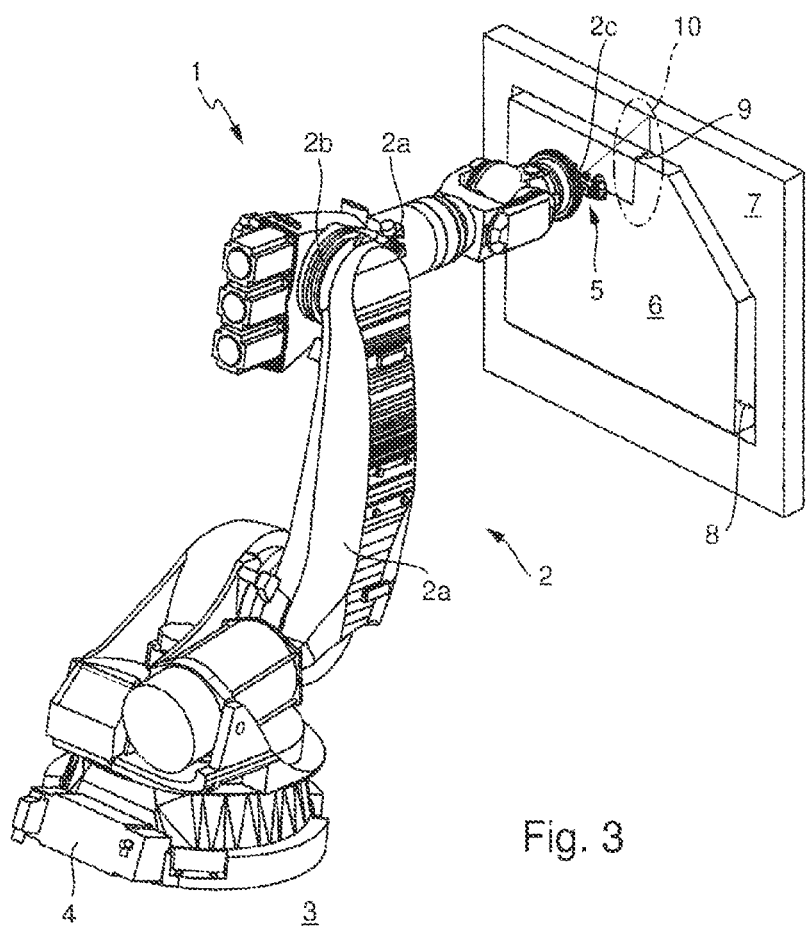
FIG. 3 shows a further embodiment of an industrial robot with an optical arrangement according to the present invention attached to the distal end of the robot arm.

FIG. 3 shows another embodiment of a manipulator 1 carrying an optical arrangement 5 according to the present invention at the distal end 2c of its arm 2.

Figures 4A, 4B:
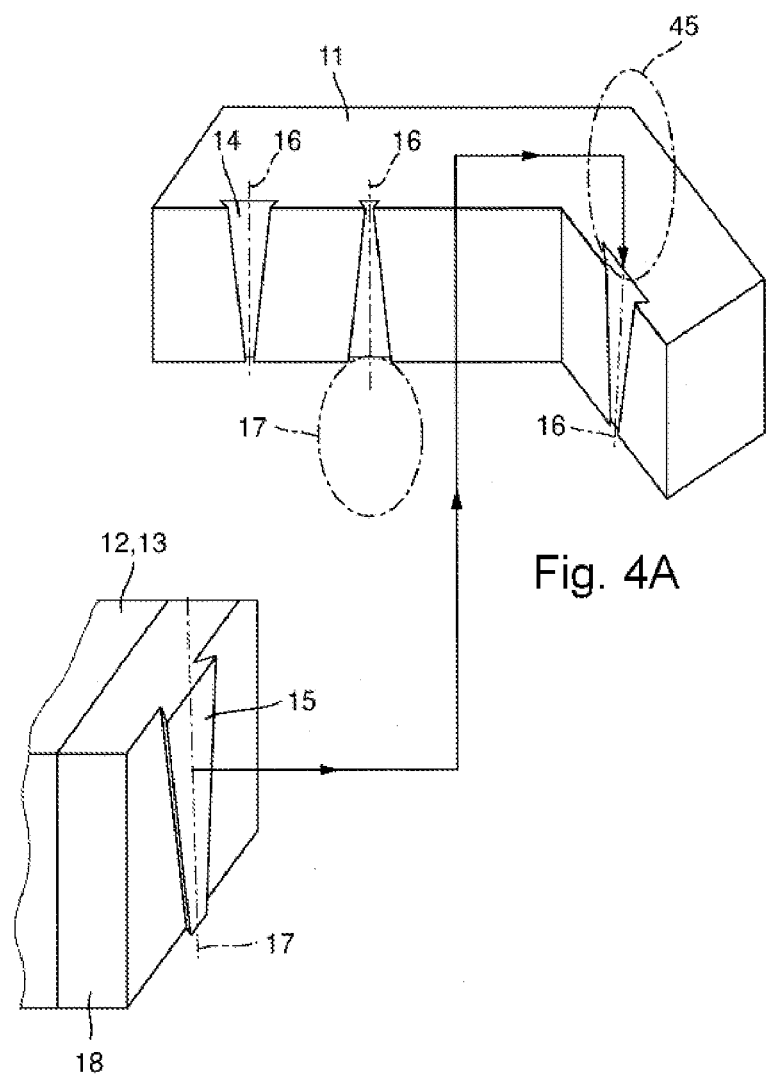
FIG. 4A shows a carrier unit of the optical arrangement according to the present invention in one embodiment.
FIG. 4B shows part of an optical acquiring unit or of a light emitting unit of the optical arrangement according to the present invention in one embodiment.

FIGS. 4A and 4B show various components of the optical arrangement 5 according to the present invention. FIG. 4A shows a carrier unit 11 (also referred to as carrier assembly) made of a rigid material like metal, in particular aluminium. The carrier assembly 11 is the backbone of the optical arrangement 5. The carrier unit 11 may include an extruded profile. It can be made in any desired length, whereby the cutting to the appropriate length can be performed simply by sawing or cutting the profile. FIG. 4B shows an optical acquiring unit 12 or a light emitting unit 13 both making part of the optical arrangement 5. The unit 12, 13 is releasably connected to the carrier unit 11 in a highly precise and exactly repeatable manner.

In one embodiment of the present invention, all sub-assemblies attached to the carrier unit 11 (for example, the optical acquiring unit 12 and/or the light emitting unit 13) are connected to the carrier unit 11 with a two-part tapered dovetail connection arrangement. The tapered dovetail connection arrangement is essentially formed by two parts, including a groove 14 and a protrusion 15 which can be inserted into the groove 14 and removed from it as desired. The groove 14 is also referred to as a "female part" of the tapered dovetail connection and the protrusion 15 is referred to as a "male part" of the connection.

According to the embodiment shown in FIGS. 4A and 4B, the grooves 14 are located at the carrier unit 11. The grooves 14 can be formed in a sidewall of the carrier unit 11 in different ways, for example by milling. In the embodiment of FIG. 4A, the carrier unit 11 includes three grooves 14. Those having ordinary skill in the art will appreciate that it would be possible to provide more or fewer than three grooves 14. Furthermore, the grooves 14 can be designed in any one or more sidewalls of the carrier unit 11. Also, the orientation of the grooves 14 along their longitudinal axes 16 can vary. The embodiment of FIG. 4A shows only grooves 14 with essentially vertical longitudinal axes 16 extending perpendicular to a longitudinal axis of the carrier unit 11. It will be appreciated that the grooves 14 could also be orientated in such a way that the longitudinal axes 16 are inclined in respect to one another and to the carrier unit's longitudinal axis.

The protrusion 15 is located at the optical acquiring unit 12 or the light emitting unit 13, respectively. The protrusion 15 has a longitudinal extension along a longitudinal axis 17. Again, the protrusion 15 can be located at the units 12, 13 in any desired position and orientation of the longitudinal axis 17. The form of the protrusion 15 essentially corresponds to the form of the groove 14. Further, it would also be possible to provide the groove 14 at the optical acquiring unit 12 or the light emitting unit 13 and one or more protrusions 15 at the carrier unit 11.

It is one characteristic of the tapered dovetail connection arrangement that the groove 14 and the protrusion 15 have a width constantly increasing or decreasing along their longitudinal axes 16, 17. In a sectional plane extending perpendicularly in respect to the longitudinal axes 16, 17, the grooves 14 and the protrusion 15 have the form of a trapeze similar to the form of a dovetail. At any given cross section along the longitudinal axes 16, the width at the bottom of the groove 14 is larger than at the open part of the grooves 14 opposite to the grooves' bottom where the groove 14 opens to the outside in the same cross section. This, in the cross section the grooves' sidewalls form an undercut. When the protrusions 15 are inserted into the grooves 14 those parts of the protrusions 15 facing the outside are received by the undercut portions of the groove 14 thereby bringing the optical acquiring unit 12 or the light emitting unit 13 in a predefined position in respect to the carrier unit 11 with a very high precision. Furthermore, the position of the optical acquiring unit 12 or the light emitting unit 13 in respect to the carrier unit 11 is repeatable, whereby after dismantling the unit 12, 13 from the carrier unit 11 and repositioning the unit 12, 13 or another similar unit 12, 13 at the carrier unit 11, the unit 12, 13 will be exactly in the same position and orientation in respect to the carrier unit 11 as before. The suggested tapered dovetail connection arrangement 14, 15 provides for a stress free, exactly repeatable releasable connection of the optical acquiring unit 12 or the light emitting unit 13 to the carrier unit 11.

The two-part tapered dovetail connection arrangement 14, 15 may include a holder for securing the optical acquiring unit 12 or the light emitting unit 13 in respect to the carrier unit 11, when the unit 12, 13 has reached its insertion end position (protrusion 15 is fully inserted in groove 14) and is properly connected to the carrier unit 11. In particular, the optical acquiring unit 12 or the light emitting unit 13 can be held in their end position in respect to the carrier unit 11 with friction of the protrusions 15 sidewalls in respect to the grooves' 14 sidewalls. Such a friction is in particular present, if the protrusion's 15 sidewalls and the groove's 14 sidewalls have the same inclination along their longitudinal extension in respect to their longitudinal axes 16, 17. In that case, the sidewalls of the protrusion 15 and of the groove 14 rest on one another with their entire surfaces in the end position.

For introducing the protrusion 15 into the groove 14, the protrusion 15 is brought into an introduction and receiving section 45 located at the wider end of the groove 14 and displaced in respect to the groove 14 along its longitudinal axis 16. The protrusion 15 is brought into the introduction and receiving section 45 with its slimmer end facing the groove 14 and then slid into the groove 14 in a movement essentially parallel to the longitudinal axis 16 of the groove 14.

As shown in FIG. 4B, the protrusion 15 does not necessarily have to be directly connected to the optical acquiring unit 12 or the light emitting unit 13. In the embodiment shown in FIG. 4B, the protrusion 15 is arranged on a coupling element 18, which is releasably connected to the optical acquiring unit 12 or the light emitting unit 13 or to another component in connection with the units 12, 13. A coupling element 18 and a component 12; 13 connected thereto form a certain sub-assembly. The coupling element 18 is described in further detail with reference to FIGS. 9 to 12 below.

Any sub-assembly 12; 13 attached to the carrier assembly 11 via a tapered dovetail connection 14, 15 can be inserted from one side only and in one direction only. The assembly 12; 13 slides along the direction of the tapered dovetail connection 14, 15 and once fully inserted, a locking screw 14a (see FIG. 21) for holding or securing the assembly 12, 13 in respect to the carrier unit 11 is inserted and tightened to prevent the assembly 12, 13 from sliding out. The required torque applied to the locking screw 14a is low but on the other hand high enough to take up any clearance in the tapered dovetail connection 14, 15. The torque applied to the screw 14a can be controlled by existing torque limiting tools, in order to provide for the tapered dovetail connection 14, 15 to be slightly pre-stressed and clearance free. Therefore, the tapered dovetail concept achieves a substantially stress free, clearance free and quickly releasable connection with repeatable and high repositioning accuracy. This accuracy can be tailored to meet the requirements of the application using existing manufacturing methods such as machining, grinding and wire erosion. Wire erosion in particular is a highly accurate manufacturing method, capable of achieving tolerances of just a few microns.

The importance of the tapered dovetail connection 14, 15 is that it establishes an interface that separates variations in the camera or laser sub-assemblies 12, 13 from the supporting structure 11 underneath the tapered dovetail connection 14, 15 that does not have such variations. Variations in the camera and laser sub-assemblies 12, 13 occur as a result of manufacturing tolerances and assembly procedures of individual parts within these sub-assemblies 12, 13. For this reason the camera and laser sub-assemblies 12, 13 above the tapered dovetail connection 14, 15 are provided with articulating features, for example a ball joint connection that provide adjusting and locking capabilities. These articulating features are described in greater detail below.

Since the tapered dovetail connection 14, 15 provides for a repeatable and highly accurate repositioning of a given sub-assembly 12; 13 and does not itself introduce variations that could affect the accuracy of the measurement system (optical arrangement) 5 in any significant way, camera and laser sub-assemblies 12, 13 can be treated as individual entities. This enables those sub-assemblies 12, 13 to be adjusted for variations of individual elements within those sub-assemblies 12, 13, calibrated and serialized as individual units so that they are uniquely identified within a metrology system (optical arrangement) 5. Therefore, instead of handling differences of a large measurement system 5 due to replacement of individual camera, laser and sensor sub-assemblies 12, 13, differences of those parts are handled at individual level. This is only possible because the tapered dovetail connection 14, 15 establishes an imaginary demarcation line above which there are variations from individual parts of the sub-assemblies 12, 13 and below which there are no such variations.

Figure 5:
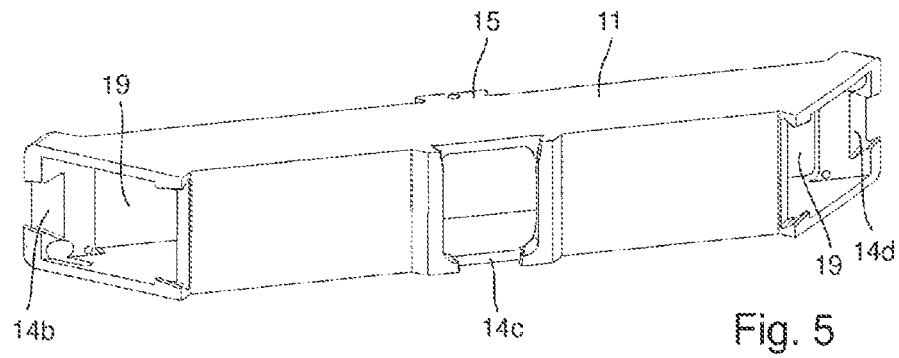
FIG. 5 shows a further embodiment of a carrier unit in a frontal view.
Figure 6:
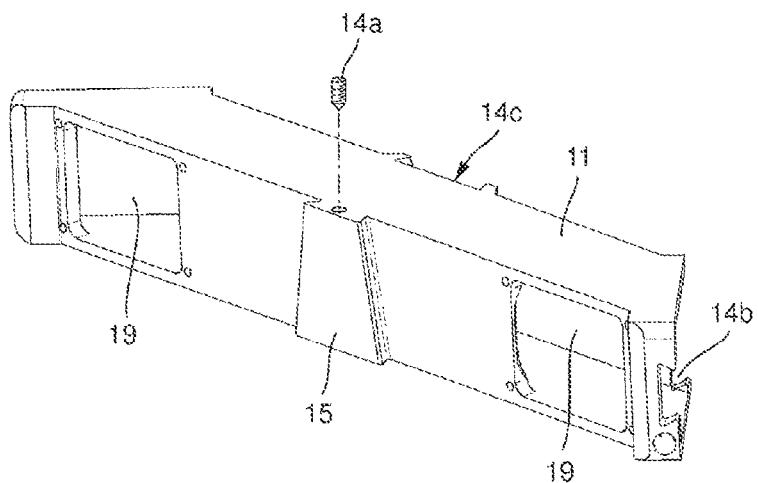
FIG. 6 shows the carrier unit of FIG. 5 in a rear view.

FIG. 5 shows one embodiment of the carrier assembly 11. In general, camera assembly 12, laser assembly 13 and an external attachment assembly 11a (see FIGS. 17 to 24) for connecting the carrier assembly 11 to the distal end 2c of a robot arm 2 or to any other supporting framework (see FIGS. 14, 20, 27 and 28) can be attached to the carrier assembly 11 from various positions; from the sides, from the back and also from the front as shown in FIGS. 5 and 6. Although not shown in the current illustration, it is appreciated that tapered dovetail connections 14, can be located at the top and/or the bottom of the carrier unit 11, too.

Furthermore, it is appreciated that although the various embodiments of the carrier unit 11 are shown as having a square cross section, the carrier unit 11 could also have any other cross section as long as it is provided with a flat portion to allow for the machining of one part 14; 15 of the tapered dovetail connection 14, 15. Such other cross sections could be, for example, triangular, hexagonal, octagonal, or any other regular or irregular cross section.

In addition, the carrier unit 11, although shown in the Figures as having an essentially straight extension along its longitudinal axis, could also be curved or angled having straight portions connected together so as to form a curved or angled shape (see FIG. 4A).

The position and orientation of the tapered dovetail connections 14, 15 in connection with the shape of the carrier unit 11 provide a highly flexible way to conFigure the optical arrangement 5, for example, the laser and stereo triangulation sensor. The geometry of the sensors 5 can be changed by varying the distance between attachment of various sub-assemblies 12, 13 attached to the carrier unit 11 and the angle relative to one another.

Figures 7A, 7B:
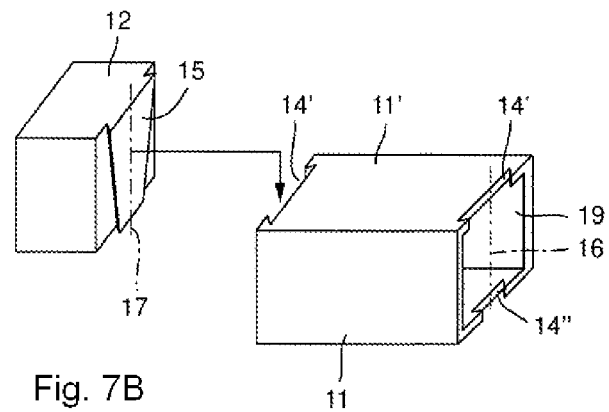
FIG. 7A shows a carrier unit of the optical arrangement according to the present invention in one embodiment.
FIG. 7B shows part of an optical acquiring unit or of a light emitting unit of the optical arrangement according to the present invention in one embodiment.
Figure 8:
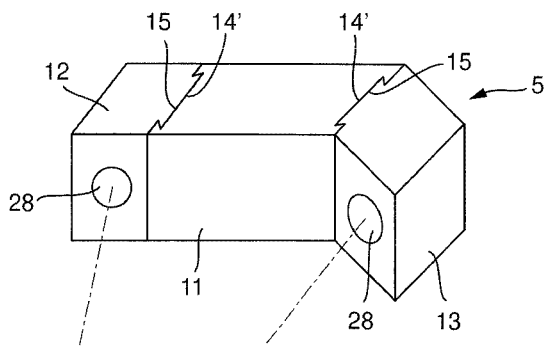
FIG. 8 shows an optical arrangement according to the present invention in one embodiment.

FIG. 8 shows a further embodiment of the optical arrangement 5 according to the present invention. This embodiment is partly shown in detail in FIGS. 7a and 7b. As shown, the carrier unit 11 is made of a hollow profile. At the distal end of the profile 11 the grooves 14 have been milled into the material of the profile 11. Due to the hollow cross section of the profile 11, the groove 14 essentially includes a first part 14' located at the distal end of a first sidewall 11' and a second part 14" located at the distal end of another sidewall (not visible in FIGS. 7A to 8) opposite to the first sidewall 11'. The two partial grooves 14', 14" together form the groove 14 and function just the same way as described above in respect to the embodiment of FIGS. 4a, 4b. The fact that in the embodiment of FIGS. 7A, 7B the grooves 14 are not continuous but rather made up of two separate parts 14', 14" has no negative impact on the functioning of the tapered dovetail connection arrangement 14, 15 suggested in the present invention for releasably connecting the optical acquiring unit 12 and/or the light emitting unit 13 and/or the external attachment assembly 11a to the carrier unit 11 of the optical arrangement 5.

As shown in FIG. 7A, the carrier unit 11 has a hollow space 19 in its inside, which opens to the outside at the distal ends of the profile 11. A controller for the optical acquiring unit 12 and/or the light emitting unit 13, for example a central processing unit (CPU) with appropriate software for processing and controlling executed on the processing unit, can be located within the space 19. The controller is in a data communication connection with the robot's control unit 4 and/or with the higher-ranking external controller. Furthermore, the cabling for connecting the controller with the optical acquiring unit 12 and the light emitting unit 13 can also be fully integrated within the hollow space 19. The openings of the hollow space 19 at the distal ends of the carrier unit 11 are then completely closed by locating the optical acquiring unit 12 and the light emitting unit 13, respectively, at the distal ends of the carrier unit 11. Hence, in the embodiment of FIGS. 7A, 7B and 8, the optical acquiring unit 12 and the light emitting unit 13 also serve as removable covers for the openings of the hollow space 19 of the carrier unit 11. As a result, the optical arrangement 5 according to the present invention shown in FIG. 8 is completely closed and shows no electronic components and cabling as these are fully integrated into the inside 19 of the optical arrangement 5. This has the advantage that no cables run outside the carrier unit 11, which would risk to entangle with the component 7 or other parts within the working area 10. The optical arrangement 5 according to the present invention besides the functional advantages also has a very appealing appearance.

In the embodiments of FIGS. 5 and 6 separate covers provided to close the openings of the hollow space 19 after insertion and connection of the controller and/or the cabling. The covers are attached to the carrier unit 11 with one or more fastening elements, in particular screws.

Figure 9:
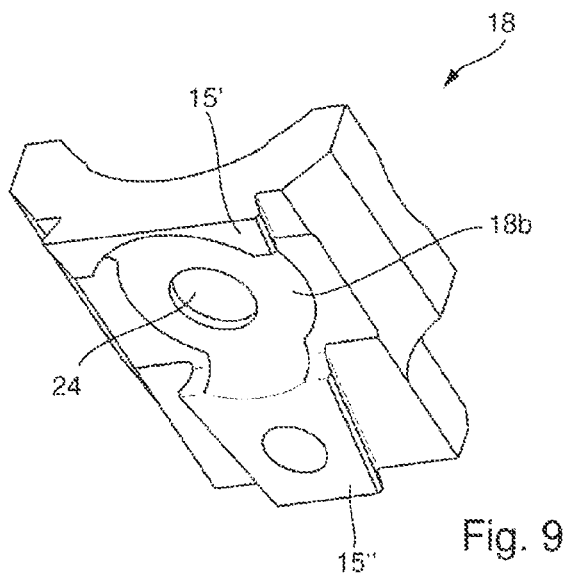
FIG. 9 shows bottom view of a coupling element, (for example, spherical cradle) for the optical acquiring unit, showing a tapered dovetail connection for connecting the optical acquiring unit to the carrier unit.
Figure 10:
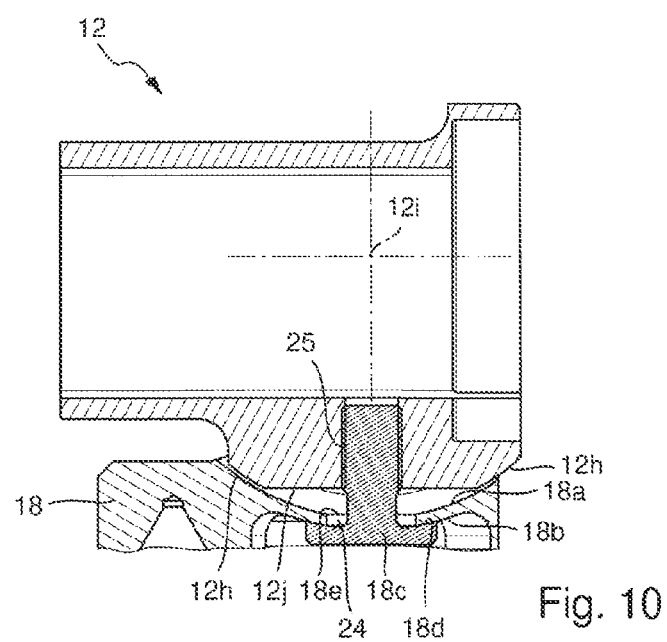
FIG. 10 shows a cross section of the optical acquiring unit.
Figure 11:
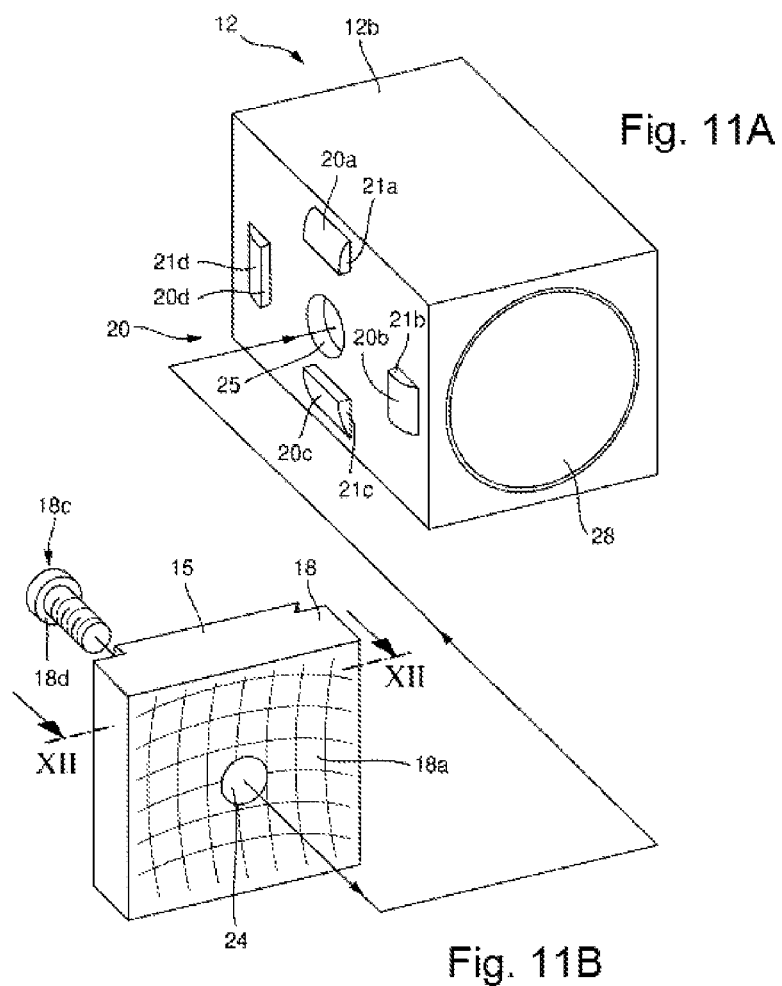
FIG. 11A shows part of an optical acquiring unit or of a light emitting unit of the optical arrangement according to the present invention in one embodiment.
FIG. 11B shows a coupling element of the optical acquiring unit or of the light emitting unit of the optical arrangement according to the present invention in one embodiment.

FIG. 9 shows a coupling element 18 in the form of a spherical cradle, including one part of the tapered dovetail connection 14, 15 for example the protrusion 15, on one side and a receiving surface 18a for the camera housing 12b on the opposite side. FIG. 10 shows a longitudinal cross section AA1 in FIG. 14 through the camera assembly 12. The camera housing 12b has a spherical element 12h at its bottom that is part of a sphere whose centre 12i is located in the centre of the imaging sensor of the camera 12, in particular in the centre of the sensor surface. The spherical surface 12h of the camera housing 12b is mated with a corresponding convex spherical surface 18a on the cradle 18 whose centre is also located in the centre 12i of the imaging sensor. This arrangement allows the camera housing 12b—and hence the camera 12 therein—to be rotated in all three axes relative to the centre 12i of the imaging sensor of the camera 12 and within a range of about ±15°, preferably ±6°.

The cradle 18 has a small spherical dome 18b on its outside (on the side opposite to the spherical surface 18a). The centre of this external dome 18b is concentric with the centre 12i of the inner spherical surface 18a and both are concentric with the centre 12i of the imaging sensor of the camera 12. A locking bolt 18c has a concave spherical surface 18d on the inside face of the bolt's head. This surface 18d mates with the external convex spherical surface 18b of the cradle 18 so when the locking bolt 18c is slightly loosened and the camera housing 12b rocks inside the cradle 18, surface 18d of the locking bolt 18c rolls on the domed surface 18b. All spherical surfaces are concentric to the centre 12i of the imaging sensor of the camera 12.

The spherical surface 12h at the bottom of the camera housing 12b has a relief 12j whereas the spherical surface 18a of the cradle 18 has a relief 18e. The longitudinal extension of the cradle's 18 relief 18e is oriented approximately 90° to the longitudinal extension of the camera housing's 12b relief 12j. This allows contact between the camera housing 12b and the cradle 18 at four outer spherical pads (see pads 21a to 21d in FIG. 11A) so that when the locking bolt 18c that is located in the middle of those pads is tightened, the camera housing 12b is locked very securely in its current orientation with respect to the cradle 18.

FIG. 9 shows another feature of the cradle, the tapered male dovetail 15. The protrusion feature 15 engages with a corresponding tapered female dovetail feature 14 shown in FIGS. 4a, 5, 6 and 7a located at the carrier unit 11. Therefore, the fully adjusted, locked and calibrated camera assembly 12 can be removed and replaced as a self-contained unit by another camera assembly 12 by using the highly accurate and repeatable external interface of the tapered dovetail connection arrangement 14, 15.

FIG. 11A shows another embodiment of the optical acquiring unit 12. FIG. 11B shows the corresponding coupling element 18, on which one of the two parts of the two-part tapered dovetail connection arrangement 14, 15 is arranged. In the embodiment shown in FIG. 11B the protrusion 15 of the tapered dovetail connection arrangement is located at the coupling element 18. The coupling element 18 can be releasably connected to a bearing surface 20 of the housing 12b of the optical acquiring unit 12. Of course, it would also be possible to provide one of the optical acquiring unit 12 or the light emitting unit 13 with a groove 14 and the other unit 13; 12 with a protrusion 15 and to provide corresponding parts 15, 14 of the tapered dovetail connection arrangement at the carrier unit 11.

Preferably, the bearing surface 20 has a spherical form. According to the embodiment shown in FIG. 11A the form of the bearing surface 20 is defined by partial surfaces 20a to 20d of at least three (in the present embodiment four) pads 21a to 21d all located on the same side 20 of the housing 12b of the optical acquiring unit 12. The coupling element 18 includes the spherical slipping surface 18a facing the bearing surface 20 and having the same radius as the bearing surface. Hence, when the slipping surface 18a rests on the bearing surface 20 and the partial surfaces 20a to 20d, respectively, element 18 can be moved in respect to the optical acquiring unit 12. By moving the coupling element 18 in respect to the optical acquiring unit 12 the position and orientation of the protrusion 15 can be varied in respect to the optical acquiring unit 12 for adjustment and calibration purposes.

Further, the fastening element 18c is provided for releasably connecting and securing the coupling element 18 to the bearing surface 20 of the optical acquiring unit 12 in a desired position and orientation. In the embodiment shown in FIG. 11B, the fastening element 18c is a screw having a screw head and a at least partially threaded screw body. When releasably connecting the coupling element 18 to the bearing surface 20, the screw body is inserted into an opening 24 being a conventional through hole and provided in the coupling element 18. The diameter of the opening 24 is preferably larger than the diameter of the screw body. Then the screw body is screwed into a threaded hole 25 provided in the bearing surface 20. An internal collar surface 18d of the screw head facing the screw body rests on the outer dome shaped surface portion 18b (see FIG. 12) of the coupling element 18. By tightening the screw 18c, the coupling element 18 is pressed against the bearing surface 20 with its sliding surface 18a by the collar surface 18d, thereby securing and fastening the coupling element 18 in respect to the optical acquiring unit 12 in its current position and orientation.

For adjusting the relative position and orientation of the coupling element 18 in respect to the optical acquiring unit 12, the screw 18c is slightly loosened. Then, the coupling element 18 can be more or less freely moved in respect to the bearing surface 20 and the optical acquiring unit 12. Thereby, the collar surface 18d slides on the outer surface portion 18b of the coupling element 18.

Figure 12:
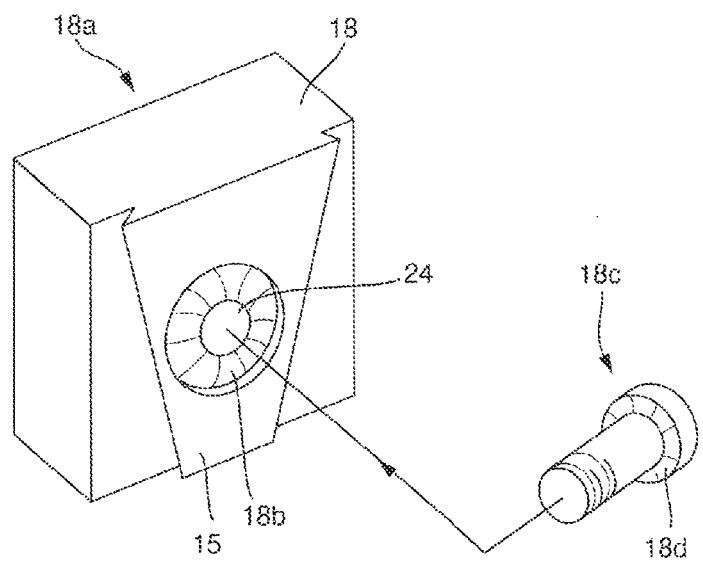
FIG. 12 shows the coupling element of FIG. 11B in a view along lines II-II.

FIG. 12 shows the back of the coupling element 18 of FIG. 11B. The outer surface portion surrounding the hole 24, on which the collar surface 18d of the screw 18c slides, is designated with the reference sign 18b. The surface portion 18b has a spherical form corresponding to the form of the sliding surface 18a and the bearing surface 20, in particular having the same centre than those two surfaces 20, 18a. The collar surface 18d may also have a spherical form corresponding to the spherical form of the surface portion 18b, the sliding surface 18a and the bearing surface 20, hence having the same centre. The spherical form of the surface portion 18b and of the collar surface 18d allows a free movement (with the screw 18c loosened) of the coupling element 18 in respect to the bearing surface 20 and in particular a precise, safe and secure fastening of the coupling element 18 in respect to the optical acquiring unit 12 when the screw 18c is tightened. When tightening the screw 18c the collar surface 18d rests with its entire surface on the spherical surface portion 18b. Therefore, tightening of the screw 18c is possible without provoking a movement of the coupling element 18 in respect to the bearing surface 20 during the process of tightening.

Figure 13:
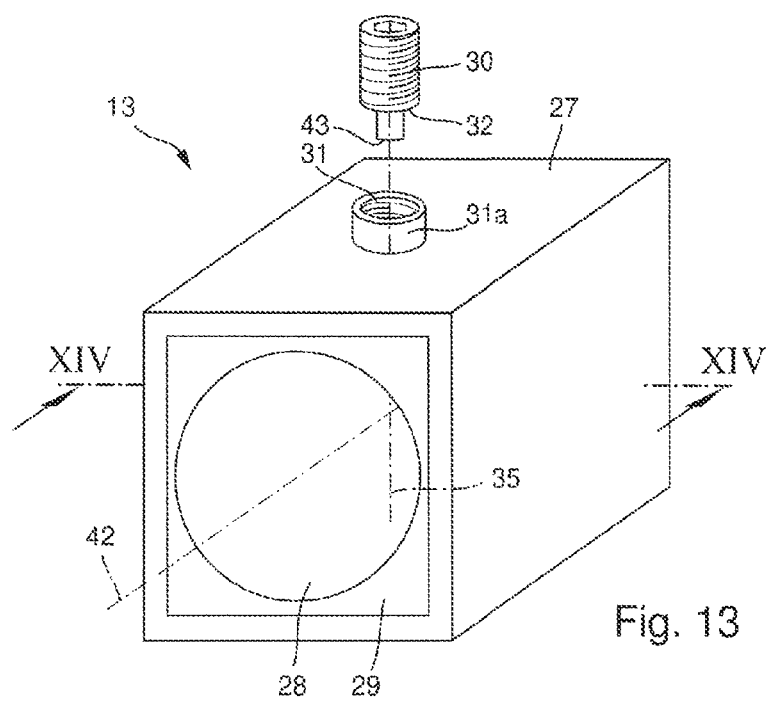
FIG. 13 shows part of an optical acquiring unit or of a light emitting unit of the optical arrangement according to the present invention in one embodiment.
Figure 14:
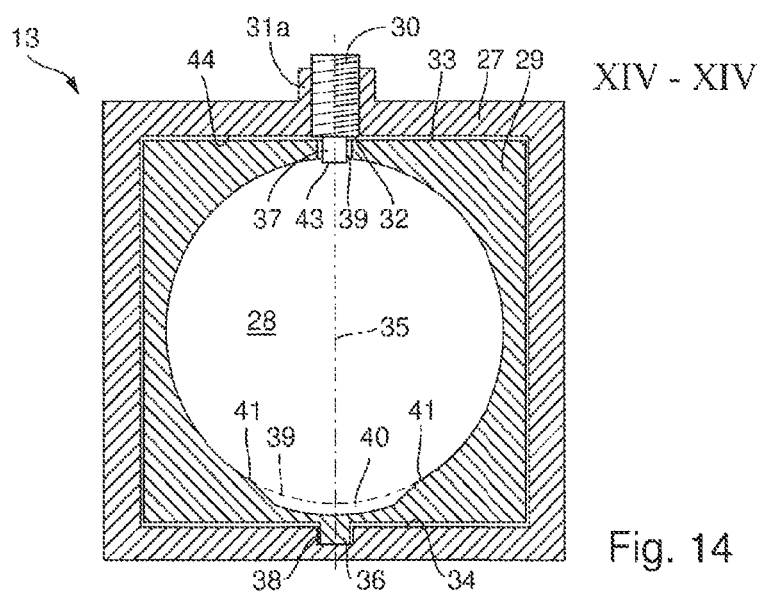
FIG. 14 shows part of the optical acquiring unit or of the light emitting unit of FIG. 13 in a sectional view along a sectional plane XIV-XIV.

FIGS. 13 and 14 show an embodiment of a light emitting unit 13 making part of the optical arrangement 5 according to the present invention. According to this embodiment the actual light emitter of the light emitting unit 13 is attached to an insertion element 29, which is movably inserted in the holding element 27 connected to the carrier unit 11 in the above-identified way with the two-part tapered dovetail connection arrangement 14, 15 (not shown in FIGS. 13, 14). A fixing element 30 is provided for fixing the insertion element 29 in a desired position and orientation in respect to the holding element 27. In the embodiment shown in FIGS. 13 and 14 the fixing element 30 is designed as a headless screw to be screwed into a threaded hole 31 provided in the holding element 27 of the light emitting unit 13. The threaded hole 31 can be provided completely within the material of the holding element 27, wherein the opening of the threaded hole 31 extends essentially within the plane defined by the outer upper surface of the holding element 27. Alternatively, as shown in FIGS. 13 and 14, the threaded hole 31 is provided within a collar element 31a protruding from the upper outer surface of the holding element 27.

The fixing element 30 has an abutment surface 32, which presses against an outer surface 33 of the insertion element 29 when the screw 30 is tightened. Thereby, the insertion element 29 is pressed against a bottom surface 34 of the holding element 27, thereby securing the insertion element 29 in respect to the holding element 27 in its current position and orientation. When loosening the screw 30 again, the insertion element 29 can be freely moved within the holding element 27 around a vertical axis 35. The axis 35 of rotation is defined by a bottom pin 36, preferably integrally formed on a bottom surface of the insertion element 29, and by an upper pin 37, preferably making part of the screw 30. The bottom pin 36 extends into a guiding hole 38 located in the inner bottom surface 34 of the holding element 27. The upper pin 37 extends into an opening 39 disposed in the top surface 33 of the insertion element 29. In FIG. 14 the openings 38, 39 seem to have a much larger diameter than the guiding pins 36, 37. This has been drawn in this way for clarity purpose only. Thus, the diameter of the guiding holes 38, 39 is only slightly larger than the diameter of the guiding pins 36, 37, in order to ensure a movement of the insertion element 29 around the axis of rotation 35 in respect to the holding element 27 essentially free of play.

The opening 28 for receiving the actual light emitter (for example, laser) of the light emitting unit 13 is located within the insertion element 29. The opening 28 has an essentially circular inner cross sectional form and extends along a longitudinal axis 42 perpendiculars to the vertical axis 35. The circular form of the opening 28 is designated with reference sign 39 in FIG. 14. As shown, opposite to the screw 30 and the abutment surface 32 and the distal bottom and surface 43, the inner circumferential form of the opening 28 deviates from the circular form 39. In particular, at the bottom of the opening 28 a recess 40 is defined. Given that the actual light emitter of the light emitting unit 13 has a circular cross sectional form, too, sections 41 between the circular form 39 of the opening 28 and the recess 40 act as resting shoulders for the actual light emitter.

The actual light emitter can be moved within the opening 28 of the insertion element 29 parallel to the longitudinal axis 42 (see FIG. 13). When the fixing element 30 is screwed into the threaded hole 31 the distal bottom end surface 43 of the guiding pin 37 fixes the actual light emitter within the opening 28 in a desired position in respect to the insertion element 29 by pressing the light emitter against the resting shoulders 41. Preferably, the fixing element 30 fixes the insertion element 29 in the desired position in respect to the holding element 27 (with the abutment surface 32 as described above) and at the same time also fixes the actual light emitter within the opening 28 in the desired position in respect to the insertion element 29 (with the end surface 43). This is achieved by the collar 32 of the fixing element 30 acting upon the outer upper surface 33 of the insertion element 29 and the bottom distal end surface 43 of the fixing element 30 and the guiding pin 37, respectively, acting upon the outer surface of the actual sensor or the light emitter.

Referring now to FIG. 11A, the optical acquiring unit 12 includes the holding element or housing 12b of essentially cuboid form with an opening 28 disposed therein for receiving the camera 12a of the optical acquiring unit 12. The camera 12a of the optical acquiring unit 12 can include, for instance, an analogue or a digital optical sensor array, in particular a CCD- or a CMOS-sensor array. The camera 12a of the optical acquiring unit 12 is, for example, a CCD- or a CMOS-camera and acquires optical data from at least part of the work piece 6 within the acquiring area 10. The light emitting unit 13 may be a laser assembly including a laser 13a, a laser housing 27, a laser clamping and pivot block 29, possibly a lens cover item (not shown) and a lens filter 13c (see FIG. 24).

The laser clamping and pivoting block 29 is supported by a pin 36 at one face of the block 29 and the plain (unthreaded) portion 37 of the locking screw 30 at the opposite face of the block 29. Since the axes 35 of the pin 36 and the unthreaded portion 37 of the screw 30 are in line, the laser clamping block 29—and hence the laser 13a held by the block—can pivot by approximately ±15°, preferably by ±6°, about their common axis 35.

The locking screw 30 performs a pivotal function for the laser clamping block 29 and a locking function at the same time so when the laser/projector 13a is adjusted to the desired location, the locking screw 30 is screwed a bit further into block 29 thereby causing the block 29 and the laser 13a to be clamped against the inner surface 34 of the laser housing 27. This is a convenient way to adjust the rotation and pointing of the laser/light projector 13a and securely clamp it in place by operating a single item, the locking screw 30 in this case.

Figure 15:
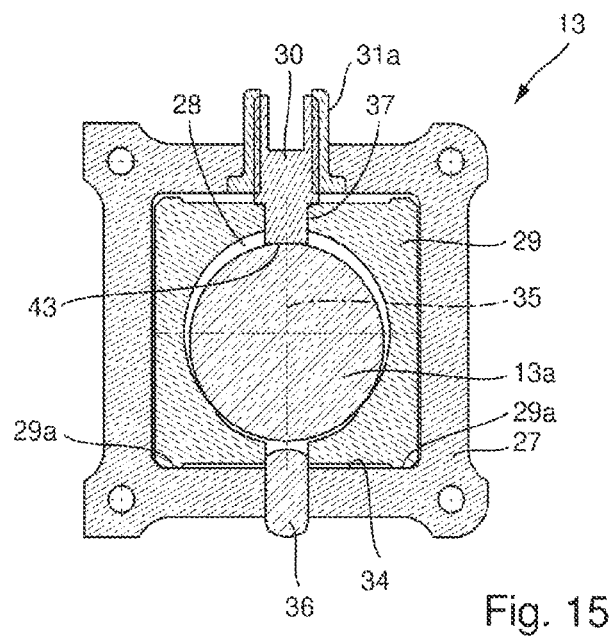
FIG. 15 shows a cross section of a light emitting unit (for example, laser assembly).

With reference to FIG. 15, when the locking screw 30 is rotated, with its distal end surface 43 it presses downward the laser/projector 13a. The laser/projector 13a in turn presses down the laser clamping and pivoting block 29 and presses the two raised outer pads 29a against the inside face 34 of the laser housing 27. This clamps the entire laser block 29 and the laser 13a against the laser housing 27 thereby securing all elements in their current position. Of course, the direction of the pressure which the screw 30 exercises on the other elements depends on the orientation of the light emitting assembly 13. For example, the screw 30 could just as well jack upwards the laser 13a and the laser block 29 or push these elements to one side. Irrespective of the shape of the laser housing 27, the mechanism of laser adjustment and clamping is the same.

Alternatively to the embodiment shown in FIGS. 13 and 14 and described above, the insertion element 29 could also have an at least partially spherically formed outer surface 33. In that case the holding element 27 would have an at least partially spherically formed inner receiving surface 34, 44 for accommodating the outer surface 33 of the insertion element 29. Thereby, the insertion element 29 and the holding element 27 would form a ball-joint-type connection allowing movement of the insertion element 29 in respect to the holding element 27 not only around the vertical axis 35 but also around a further axis (not shown in FIGS. 13 and 14) extending essentially perpendicular to the axis 35. In this alternative embodiment the insertion element 29 could be fixed by the fixing element 30 in a desired position and orientation in respect to the holding element 27 just the same way as described above with reference to the embodiment of FIGS. 13 and 14. Furthermore, the actual light emitter could be fixed in the opening 28 in any desired position in respect to the insertion element 29 with the fixing element 30 just the same way as described above with reference to the embodiment of FIGS. 13 and 14. The features and advantages of the present invention described above may be freely combined with one another. For example, it would be possible to provide for an optical acquiring unit 12 or a light emitting unit 13 having a combination of the features shown and described above as separate embodiments.

Because the optical arrangement 5 described above the optical acquiring unit 12 and the light emitting unit 13 are connected to the carrier unit 11 with an exactly repeatable connection in the form of the tapered dovetail connection arrangement 14, 15, the optical arrangement 5 has particular advantages regarding its calibration after one or more of the units 12, 13 have been replaced by other units 12, 13. Besides from being repeatable, the connection may also be stress and clearance free, which allows a connection and fixing of an already calibrated optical acquiring unit 12 and/or light emitting unit 13 to the carrier unit 11 in a predefined position and orientation with an extremely high accuracy.

In the prior art, the optical acquiring and light emitting units 12, 13 were connected and fixed to the carrier unit 11 with a much smaller precision and in a not exactly repeatable manner. Therefore, after connecting a new optical acquiring unit 12 and/or light emitting unit 13 to the carrier unit 11 the entire optical arrangement 5 had to be (re)calibrated offline in respect to a global coordinate system, thereby provoking a long interruption of the optical arrangement's intended use. This is no longer necessary in the present invention. Calibration of the separate units 12, 13 is performed offline during conventional use of the optical arrangement 5. Interruption of the intended use of the arrangement 5 is necessary only for replacing one or all of the units 12, 13 by a previously calibrated unit 12, 13. This can be effected in a very short period of time.

Figure 16:
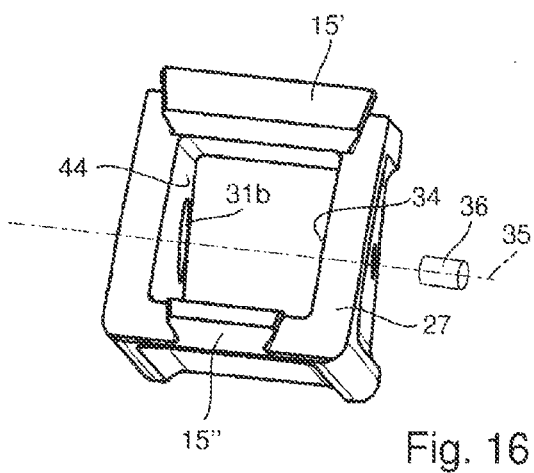
FIG. 16 shows a view of the rear of the housing of the light emitting unit (for example, laser assembly).

FIG. 16 is a view of the rear of the laser housing 27 that shows its tapered dovetail connectivity feature 15', 15" to the carrier unit 11. Flexible metrology systems for in-line measurement applications, like those shown by way of example in FIGS. 17 to 21, are made up of camera and/or laser/projector assemblies 12, 13 arranged on and mounted to a supporting framework or the distal end 2c of an arm 2 of an industrial robot 1. The laser/projector assemblies 13 project rays, sheets or other patterns of light commonly known in the art as "structured light" onto the surface of the object(s) 6, 7 to be measured. The camera assemblies 12 measure the features created by the structured light on the surface of the object 6, 7. To that end, that they need to be calibrated first. The calibration procedure transforms a network of individual cameras 12 and laser/projectors 13 into measurement sensors 5.

Figure 17:
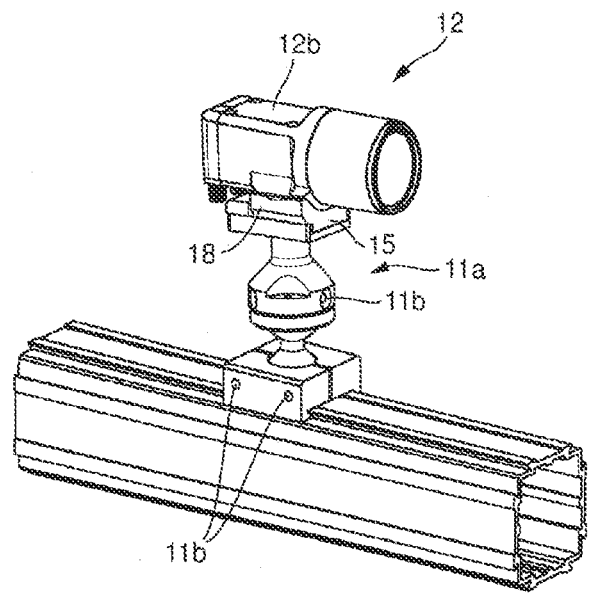
FIG. 17 shows an optical acquiring unit (for example, camera assembly).
Figure 18:
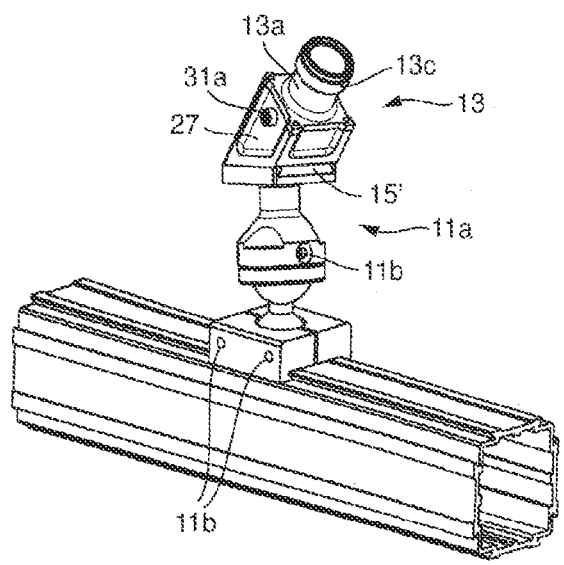
FIG. 18 shows a light emitting unit (for example, laser/projector assembly).

FIG. 17 shows a camera assembly 12 mounted through a fully articulating ball-joint connector 11a to a sliding rail of the supporting framework. Once the connector 11a is placed in the required position and orientation it can be clamped in place, for example by lightening sensors 11b. FIG. 18 shows a laser/projector assembly mounted to the supporting framework rail in a similar manner to that of the camera assembly 13 shown in FIG. 17. FIG. 19 shows two basic elements (camera assembly 12 and laser/projector assembly 13) mounted to a common carrier unit 11 to form a laser triangulation sensor. FIG. 20 shows two camera assemblies mounted into a common carrier unit 11 to form a stereo measurement sensor 5. FIG. 21 shows two cameras and a laser/projector assembly 13 combined and mounted to a single carrier unit 11 to form a stereo and laser triangulation sensor 5.

Figure 22:
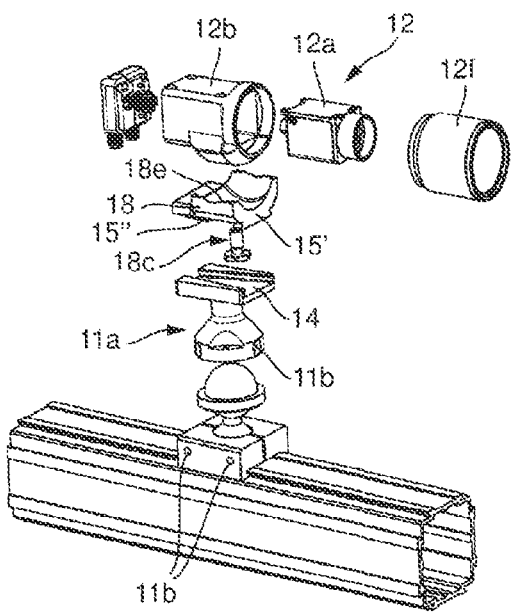
FIG. 22 shows an exploded view of the optical acquiring unit (for example, camera assembly).

FIG. 22 shows an exploded view of the camera assembly 12. As shown, the spherical surface 12h at the bottom of the camera 12 has a relief 12j in the lateral direction. Further, the spherical concave surface 18a of the camera cradle 18 has a relief 18e in the forward direction (essentially orthogonal to the lateral relief 12j of the bottom surface 12h of the camera 12). The combination of these two reliefs 12j; 18e in opposite directions results in four spherical contact pads 21a to 21d located in the outer region of the contact area of the two parts 12b, 18. The locking screw 18c that is located in the middle of those contact points, as shown in FIGS. 11A and 11B, ensures that the camera 12 and cradle 18 will be positively locked together.

The present invention attempts to rectify two problems in existing metrology systems 5 that use cameras 12. These problems relate to the adjustability and replacability of the camera unit 12. The first problem relates to the location of the camera imaging sensor with respect to the camera body 12b. Due to the variations in the imaging sensor and the way it is assembled into the camera body 12b, the position of the imaging sensor varies slightly from one camera 12 to another. As a result, the field of view of the camera 12 is slightly different from one measurement sensor to another. The present invention addresses this problem by adjusting the complete camera unit 12 relative to its base or cradle 18 in the region of +/−6 degrees, in all three axes and about the center 12i of the imaging sensor. This arrangement compensates for variations in the positioning of the imaging sensor relative to the camera body 12b as explained earlier. In this way the field of view of all measurement sensors 12 will be the same. Once the camera unit 12 is adjusted to the desired position, the camera 12a is securely locked in place relative to its base or cradle 18.

FIG. 23 shows a connector 11a that provides two things: first a fully articulating connection of the camera 12a and cradle 18 assembly 12 to the supporting framework 11 and second a quick release of the camera 12a and cradle 18 assembly 12 via a male/female tapered dovetail connection feature 14. This feature 14 provides a substantially stress free, clearance free and thus repeatable connection of the pre-adjusted and pre-calibrated (and locked in place) camera 12a and cradle 18 assembly 12 to the external world (global coordinate system).

The tapered dovetail connection feature 14 solves a further problem, namely the replaceability of the entire camera 12a and cradle 18 unit 12. This adds to the flexibility of the system 5. The precision of repetability needs to be very high—in the region of few microns—if re-calibration of the camera 12a and cradle 18 unit 12 is to be avoided.

Figure 25:
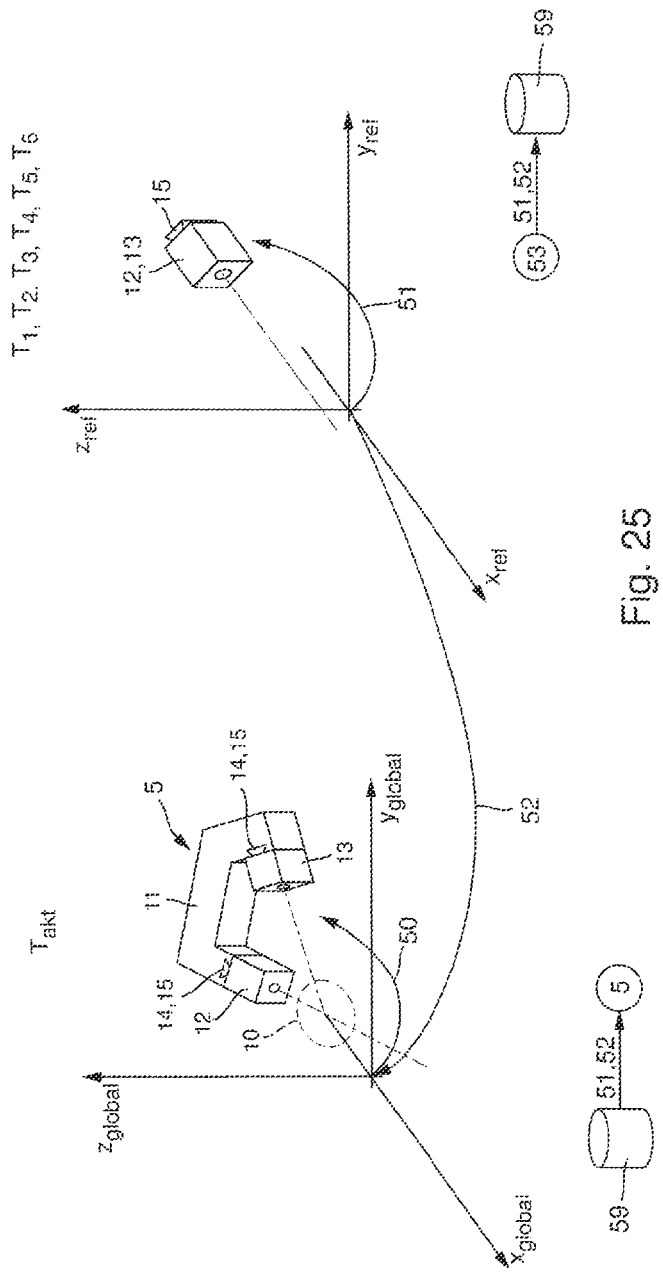
FIG. 25 shows a schematic diagram showing the principle of calibration of the optical arrangement according to the invention.

FIG. 24 shows an exploded view of the laser holder assembly 13. The principle of the calibration process of the optical arrangement 5 according to the present invention is schematically shown in FIG. 25. To begin with the arrangement 5 is calibrated in respect to a global coordinate system xyz_global. During the process of calibrating the arrangement 5 in respect to the global coordinate system xyz_global, calibration data 50 is determined, which is indicative of the optical arrangement's 5 position and orientation in respect to the global coordinate system xyz_global. Then, in a position distant to and separate from the optical arrangement 5 in its position of intended use optical acquiring units 12 and/or light emitting units 13 are calibrated beforehand in respect to a reference coordinate system xyz_ref thereby defining appropriate calibration data 51. For example, the units 12, 13 can be calibrated in respect to the reference coordinate system xyz_ref during the optical arrangement's 5 intended use. Hence, the use of the optical arrangement 5 does not have to be interrupted for calibration purposes. Due to the fact that the position and orientation of the reference coordinate system xyz_ref in respect to the global coordinate system xyz_global is known, it is possible to determine the values of a conversion matrix 52 in order to transform the calibration data 51 into calibration data 50' (the apostrophe indicates that the calibration data 50' was not acquired directly in the realm of the global coordinate system xyz_global but rather in the realm of the reference coordinate system xyz_ref and then transformed into the realm of the global coordinate system xyz_global) in respect to the global coordinate system xyz_global. The calibration data 51, 50' and/or the values of the conversion matrix 52 and/or other data indicative of the calibration data 51, 50' is stored in a database, to which the controller, the optical acquiring unit 12, and/or the light emitting unit 13 have access to at least during the optical arrangement's 5 intended use.

Because of the high precision and exactly repeatable connection arrangement, which may be a tapered dovetail connection arrangement 14, 15, one or more of the units 12, 13 may be replaced by corresponding other pre-calibrated units 12, 13, which have already been calibrated in respect to the reference coordinate system xyz_ref. The new units 12, 13 are connected and fixed to the carrier unit 11 with a high precision in a predefined known position and orientation. The calibration data 51, 50' defined in respect to the reference coordinate system xyz_ref and/or the values of the conversion matrix 52 and/or other data indicative of the calibration data 51 are taken into account during the optical arrangement's 5 intended use, thereby providing for a calibration of the new unit 12, 13 in respect to the global coordinate system xyz_global.

Figure 26:
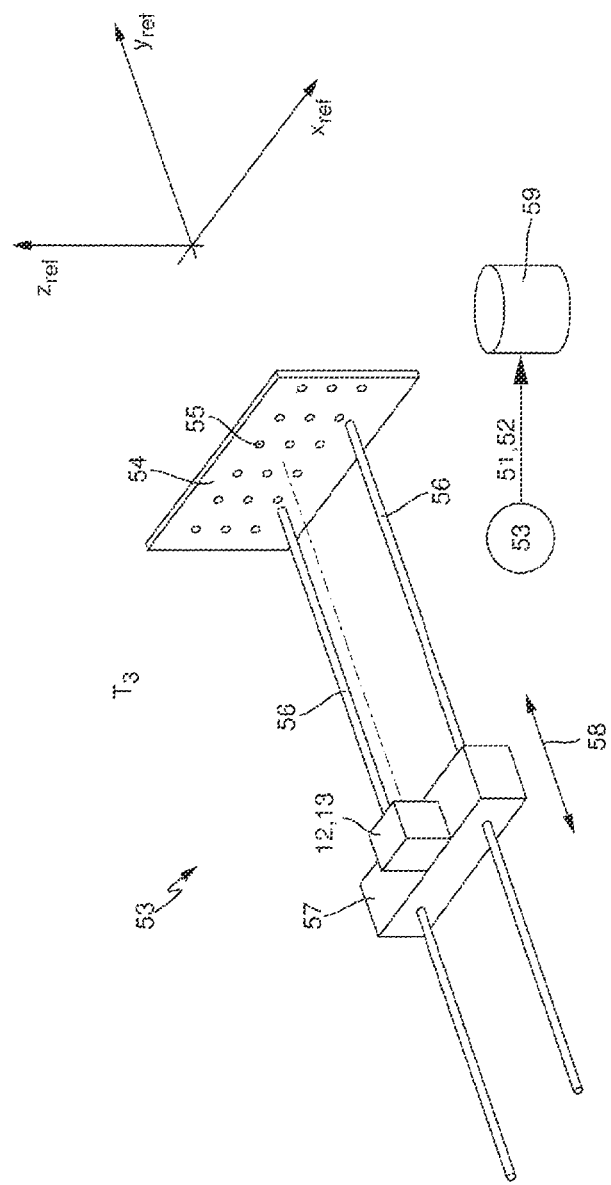
FIG. 26 shows a calibration arrangement used for offline calibration of an optical acquiring unit and/or a light emitting unit.
Figure 27:
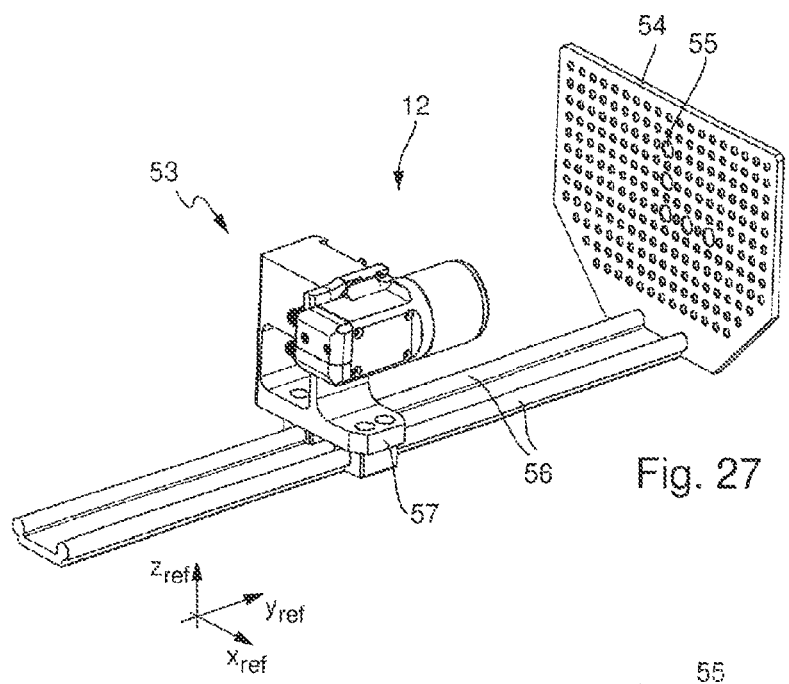
FIG. 27 shows a calibration arrangement used for offline calibration of an optical acquiring unit (for example, camera assembly).
Figure 28:
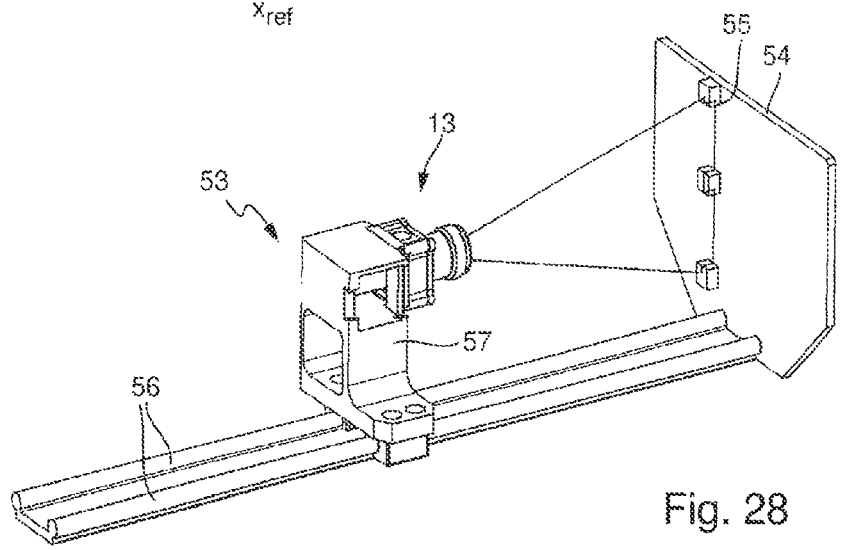
FIG. 28 shows a calibration arrangement used for offline calibration of a light emitting unit (for example, laser/projector assembly).

The offline calibration of one or more of the optical acquiring units 12 or of the light emitting units 13 may be performed with a calibration arrangement 53 like the one shown in FIGS. 26 to 28 on an exemplary basis. The calibration arrangement 53 includes a calibration surface 54 equipped with numerous calibration elements 55 of a predefined size and in a predefined arrangement. The calibration elements 55 can be coloured spots or holes, preferably with a back light for emphasizing their contour. In the present embodiment, the calibration surface 54 is part of a calibration screen 54 extending essentially vertically and transversally in respect to a longitudinal axis of the arrangement 53. Further, the calibration arrangement 53 includes at least two guiding rails 56 spaced parallel to the arrangement's 53 longitudinal axis. The guiding rails 56 carry a sledge element 57 so it can be freely moved along the longitudinal axis of the arrangement 53 in a direction generally indicated by an arrow 58. The sledge 57 is guided in such a way by the rails 56 that the movement of the sledge 57 in respect to the calibration surface 54 can be effected with a very high accuracy. The calibration arrangement 53 is located in a known position and orientation in respect to the reference coordinate system xyz_ref. This offline calibration of the entire optical arrangement 5 has to be performed only once after setup of the arrangement 5.

One or more optical acquiring units 12 and/or light emitting units 13 are attached to the sledge 57 and can be moved together with the sledge 57 in respect to the calibration surface 54 in direction 58. Moving of the sledge 57 can be performed manually and/or with an actuator, for example an electric motor or one or more solenoids. The optical axis of the unit 12, 13 to be calibrated may run parallel to the longitudinal axis of the calibration arrangement 53. By moving the sledge 57 and the unit 12, 13 in respect to the calibration surface 54, an optical acquiring unit 12 to be calibrated can take various images of the calibration elements 55 from different positions and/or the light pattern generated by a light emitting unit 13 to be calibrated can be detected and analysed by an image sensor, making part of the calibration arrangement 53, thereby allowing the generation of a set of calibration data 51 unambiguously characterizing the unit's 12, 13 position and orientation in respect to the reference coordinate system xyz_ref. Then, based on the calibration data 51, values of the conversion matrix 52 or of other data indicative of the acquired calibration data 51 can be determined and—if desired—stored in a database 59. The data may be stored in database 59 depending on and in respect to the individual identification of the unit 12, 13 being calibrated, which may be, for example, an identification number. The controller, the optical acquiring unit 12, and/or the light emitting unit 13 during the intended use of the optical arrangement 5 have access to the database 59 and can extract from the database 59 the calibration data 51, values of the conversion matrix 52 or of other data indicative of the acquired calibration data 51. The data extracted from the database 59 is used and considered during the optical arrangement's 5 intended use, in order to perform a calibration of a certain unit 12, 13 in respect to the global coordinate system xyz_global by determining calibration data 50' for the respective unit 12, 13.

According to the present invention, the controller, the optical acquiring unit 12, and/or the light emitting unit 13 extract the correct data pertaining to the unit 12; 13 to be calibrated in respect to the global coordinate system xyz_global from the database 59 with the unit's 12; 13 individual identification. The actual calibration process and the algorithms performed during calibration are described, for example, in WO 02/16865 A1 and in EP 1524494 A1.

In one embodiment of the present invention, it is suggested that the calibration data 51 is acquired at a plurality of different ambient temperatures, for example temperatures T1 to T6. For each of the calibrated units 12, 13 a separate set of calibration data 51 and consequently of values for conversion matrices 52 or of other data indicative of the calibration data 51 is determined for each of these temperatures T1 to T6 and stored in the database 59. For example, FIG. 16 shows the calibration of a unit 12; 13 during an ambient temperature of T3. The calibration of the unit 12; 13 at other ambient temperatures T1, T2 and T4 to T6 is performed accordingly. During the intended use of the optical arrangement 5 the current ambient temperature Takt is determined. The controller of the optical arrangement 5 accesses the database 59 and based on the current ambient temperature Takt select at least one set of data stored in the database 59, which was previously acquired at an ambient temperature T1 to T6 which comes closest to the current ambient temperature Takt. The at least one selected set of data is used for the online calibration of the optical acquiring unit 12 or the light emitting unit 13 during the intended use of the optical arrangement 5.

Advantageously, the selected set of data stored in the database 59 is that which was acquired at an ambient temperature T1 to T6 and which comes closest to the current ambient temperature Takt, one set of data having been acquire at a higher temperature Takt and the other set of data having been acquired at a lower temperature. For example, if T2<Takt<T3 the data sets corresponding to temperatures T2 and T3 are selected. Alternatively, those two sets of data are selected, which were acquired at ambient temperatures T1 to T6, which come closest to the current ambient temperature Takt. The data or values to be used for the online calibration of the optical acquiring unit 12 or the light emitting unit 13 during the intended use of the optical arrangement 5 are determined with interpolation among the selected two sets of data. This allows a fast and easy calibration of the optical arrangement 5 taking into account the current ambient temperature Takt.

FIG. 27 shows an example of a calibration arrangement 53 for separately calibrating an optical acquiring unit 12. FIG. 28 shows an example of a calibration arrangement 53 for separately calibrating a light emitting unit 13.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method for calibrating an optical arrangement in respect to a global coordinate system, the optical arrangement including a carrier unit made of a rigid material, an optical acquiring unit and a light emitting unit both releasably connected to the carrier unit, said method comprising the steps of:
   defining a reference coordinate system different from the global coordinate system;
   calibrating an optical acquiring unit or a light emitting unit in respect to the reference coordinate system prior to its intended use and separately from the rest of the optical arrangement by acquiring appropriate calibration data;
   connecting the calibrated optical acquiring unit or light emitting unit to the carrier unit with a two-part tapered dovetail connection;
   performing only once for a given global coordinate system and a given reference coordinate system a conventional calibration of the entire optical arrangement and thereby determining values of a conversion matrix for converting the calibration data acquired in respect to the reference coordinate system into corresponding calibration data in respect to the global coordinate system; and
   thereafter, for all further calibrated optical acquiring units and/or light emitting units connected to the carrier unit, making use of the optical acquiring units and/or light emitting units as part of the optical arrangement by considering the calibration data acquired for the optical arrangement or the respective values of the conversion matrix when generating control signals for the units and/or when processing sensor signals received from the units during the intended use of the optical arrangement.

2. The method as set forth in claim 1, wherein the optical acquiring unit or the light emitting unit is connected to the carrier unit with a stress and clearance free and repeatable connection.

3. The method as set forth in claim 1, wherein the reference coordinate system is defined in respect to a calibration arrangement separate from the optical arrangement.

4. The method as set forth in claim 1, wherein calibration of the optical acquiring unit or the light emitting unit in respect to the reference coordinate system is performed offline from and parallel to the intended use of the optical arrangement.

5. The method as set forth in claim 1, wherein the optical acquiring unit or the light emitting unit to be calibrated has a unique serial number, and wherein the acquired calibration data and/or the values of the conversion matrix or corresponding values indicative of the calibration data and/or the values of the conversion matrix are stored in a database together with the serial number of the calibrated optical acquiring unit or light emitting unit.

6. The method as set forth in claim 5, wherein a control and processing unit of the optical arrangement has access to the database and the data and/or values stored therein, in order to perform online calibration of the optical acquiring unit and/or the light emitting unit connected to the carrier unit and forming part of the optical arrangement during the intended use of the optical arrangement.

7. The method as set forth in claim 1, further including the steps of: calibrating the optical acquiring unit or the light emitting unit each at a plurality of different ambient temperatures, generating corresponding temperature dependent sets of calibration data and storing the data in a database, and during the intended use of the optical arrangement determining the current ambient temperature, accessing the database and based on the current ambient temperature selecting at least one set of calibration data to be used for the online calibration of the optical acquiring unit or the light emitting unit, which was acquired at an ambient temperature, which comes closest to the current ambient temperature.

8. The method as set forth in claim 7, wherein the set of calibration data is selected, which was acquired at an ambient temperature, which comes closest to the current ambient temperature.

9. The method as set forth in claim 7, wherein those two sets of calibration data are selected, which were acquired at ambient temperatures, which come closest to the current ambient temperature, and that the calibration data to be used for the online calibration of the optical acquiring unit or the light emitting unit during the intended use of the optical arrangement is determined with interpolation among the selected two sets of calibration data.

* * * * *